United States Patent
Niwa et al.

(10) Patent No.: US 9,166,514 B2
(45) Date of Patent: Oct. 20, 2015

(54) MOTOR CONTROL APPARATUS INCLUDING AT LEAST TWO RESISTANCE DISCHARGE UNITS

(71) Applicant: FANUC CORPORATION, Minamitsuru-gun, Yamanashi (JP)

(72) Inventors: Masakazu Niwa, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 70 days.

(21) Appl. No.: 14/021,286

(22) Filed: Sep. 9, 2013

(65) Prior Publication Data

US 2014/0070751 A1  Mar. 13, 2014

(30) Foreign Application Priority Data

Sep. 10, 2012  (JP) .................................. 2012-198628

(51) Int. Cl.
- G01R 31/02 (2006.01)
- H02P 27/04 (2006.01)
- H02P 3/12 (2006.01)

(52) U.S. Cl.
CPC . H02P 27/04 (2013.01); H02P 3/12 (2013.01)

(58) Field of Classification Search
USPC ............... 318/479, 758, 812, 400.3, 490, 494
See application file for complete search history.

(56) References Cited

U.S. PATENT DOCUMENTS

| 5,814,954 A * | 9/1998 | Suzuki et al. ................. 318/376 |
| 6,454,053 B2 * | 9/2002 | Tominaga et al. ............ 187/290 |
| 2004/0245951 A1 * | 12/2004 | Yamada et al. ............... 318/376 |
| 2011/0031939 A1 * | 2/2011 | Funaba et al. ................. 320/166 |

FOREIGN PATENT DOCUMENTS

| JP | 3139183 A | 6/1991 |
| JP | 2002-120973 A | 4/2002 |
| JP | 2003-088144 A | 3/2003 |
| JP | 2006160383 A | 6/2006 |
| JP | 2006-262616 A | 9/2006 |
| JP | 2009-213200 A | 9/2009 |

OTHER PUBLICATIONS

Partial Translation of Office Action mailed Apr. 8, 2014, corresponds to Japanese patent application No. 2012-198628, is being provided as a concise explanation of relevancy for JPH3139183.

* cited by examiner

*Primary Examiner* — Rina Duda
*Assistant Examiner* — Bickey Dhakal
(74) *Attorney, Agent, or Firm* — Hauptman Ham, LLP

(57) ABSTRACT

A motor control apparatus includes a rectifier for rectifying AC power to output DC power; an inverter for performing power interconversion of DC power of a DC link and AC power being driving power or regenerative power of a motor by being connected to the DC link being a DC output side of the rectifier; and at least two resistance discharge units each for performing resistance discharge of DC power of the DC link, the resistance discharge units each being connected to the DC link, in which each resistance discharge unit starts a resistance discharge operation for performing resistance discharge of DC power of the DC link at a DC voltage value in the DC link exceeding a first threshold value and stops the resistance discharge operation at a DC voltage value in the DC link smaller than a second threshold value below the first threshold value.

10 Claims, 14 Drawing Sheets

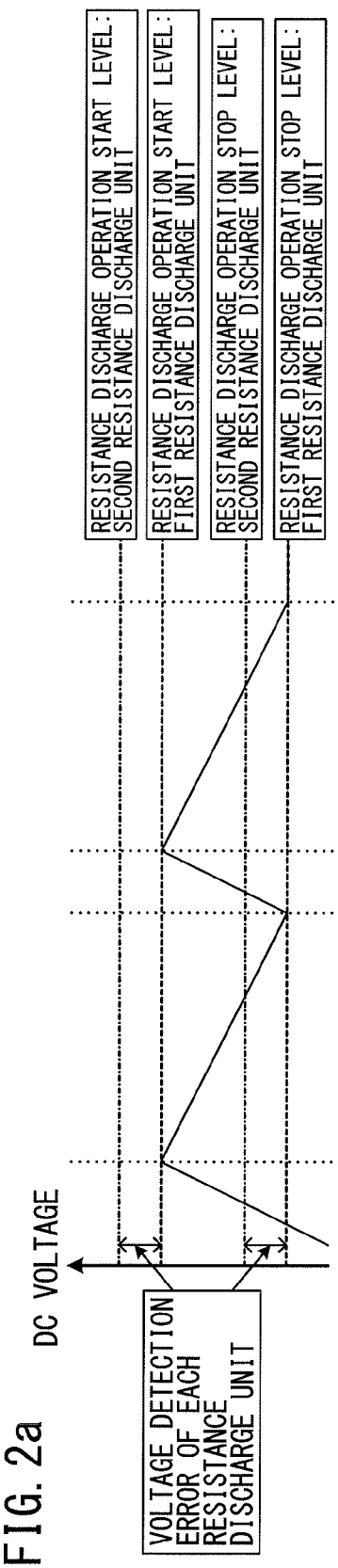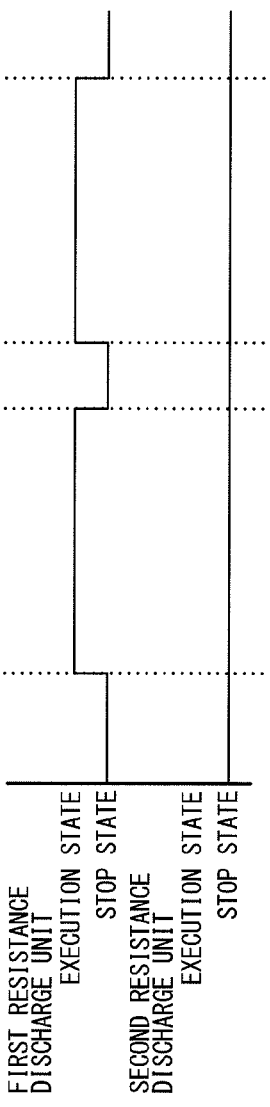

FIG. 5

| RESISTANCE DISCHARGE UNIT 113-1 | RESISTANCE DISCHARGE UNIT 113-2 | SUPERIOR DISCHARGE OPERATION COMMAND UNIT |
|---|---|---|
| 0 | 0 | 0 |
| 1 | 0 | 1 |
| 0 | 1 | 1 |
| 1 | 1 | 1 |

FIG. 6

| RESISTANCE DISCHARGE UNIT 113-1 | RESISTANCE DISCHARGE UNIT 113-2 | SUPERIOR DISCHARGE OPERATION COMMAND UNIT |
|---|---|---|
| 0 | 0 | 0 |
| 1 | 0 | 0 |
| 0 | 1 | 0 |
| 1 | 1 | 1 |

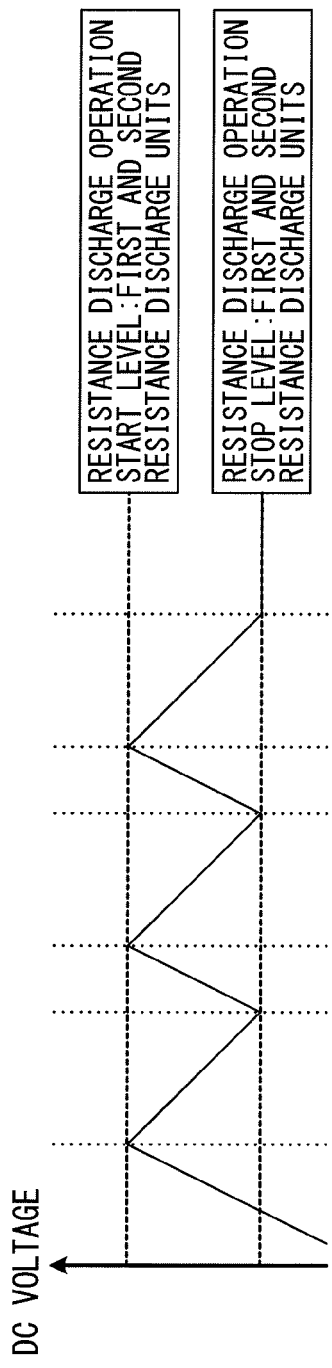
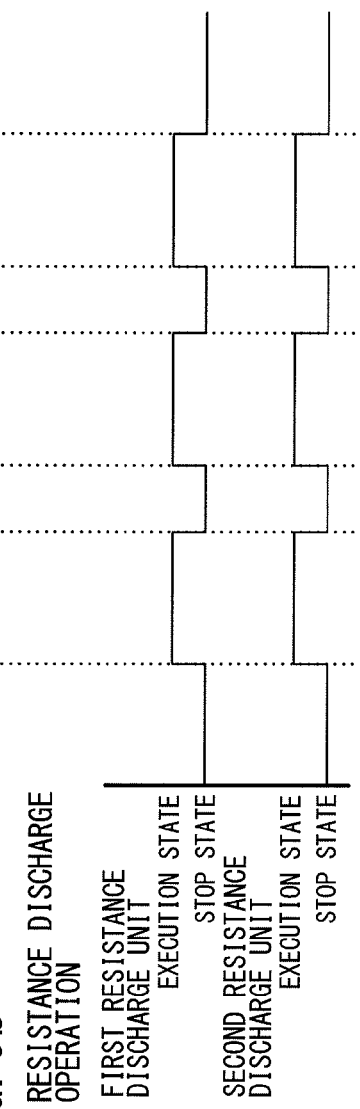

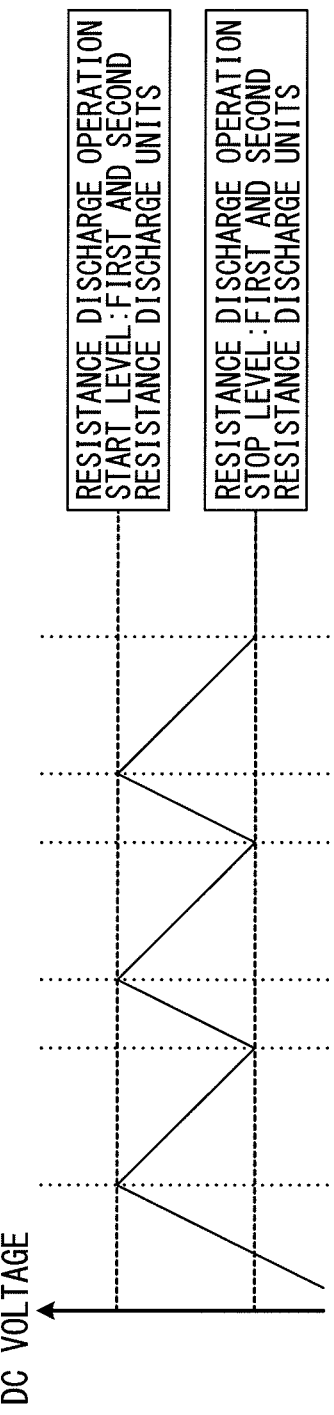
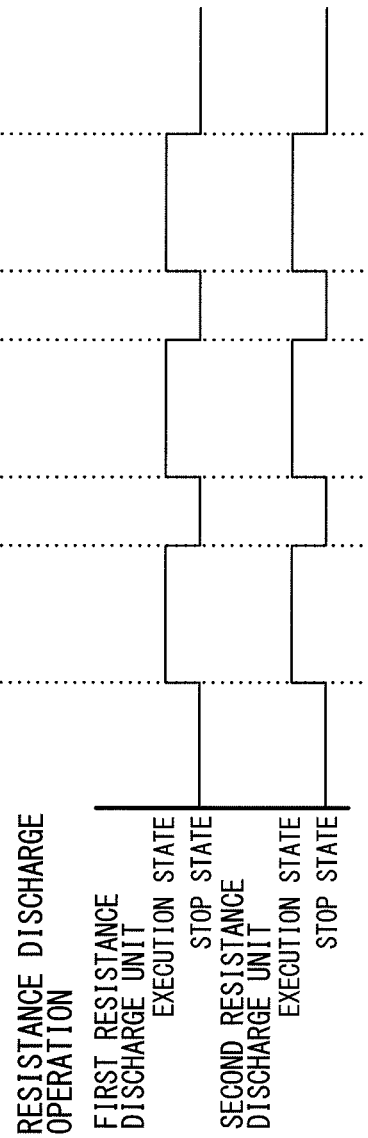
FIG. 14a
FIG. 14b

MOTOR CONTROL APPARATUS INCLUDING AT LEAST TWO RESISTANCE DISCHARGE UNITS

RELATED APPLICATIONS

The present application is based on, and claims priority from, Japanese Application Number 2012-198628, filed Sep. 10, 2012, the disclosure of which is hereby incorporated by reference herein in its entirety.

BACKGROUND OF THE INVENTION

1. Field of the Invention

The present invention relates to a motor control apparatus for converting AC power supplied from an AC input side into DC power to be output and further for converting the DC power into AC power for driving a motor that is supplied to the motor, and in particular, to a motor control apparatus including at least two resistance discharge units.

2. Description of the Related Art

In motor control apparatuses for driving motors in machine tools, forging presses, injection molding machines, industrial machines, and robots, AC power input from an AC input side is temporarily converted into DC power, followed by further conversion into AC power, and this AC power is used as driving power of a motor provided in each drive axis. A motor control apparatus includes a rectifier for rectifying AC power supplied from an AC input side including a three-phase AC input power source to output DC power; and an inverter for performing power interconversion of DC power of a DC link and AC power that is driving power or regenerative power of a motor, the inverter being connected to the DC link that is a DC output side of the rectifier, in which a speed or torque of a motor connected to an AC output side of the inverter or a position of a rotor is controlled.

In recent years, from the viewpoint of a demand for saving energy, in a motor control apparatus, a regeneration-type rectifier capable of returning regenerative energy generated during deceleration of a motor to an AC input side is being frequently used.

However, in cases where a three-phase AC input power source disposed on the AC input side is a generator or power fails on the AC input side, regenerative energy is difficult to return to the AC input side. To cope with such situations, countermeasures are taken, in which a resistance discharge unit is added on a DC link between a rectifier and an inverter inside an existing motor control apparatus to consume regenerative energy generated during motor deceleration as thermal energy of a resistance (referred to also as a "discharge resistor") inside the resistance discharge unit.

FIG. 15 is a view illustrating a configuration of a general motor control apparatus including a resistance discharge unit. As illustrated in FIG. 15, a motor control apparatus 401 includes a rectifier 411 for rectifying AC power supplied from an AC input side including a three-phase AC input power source 3 to output DC power; an inverter 412 for performing power interconversion of DC power of a DC link and AC power that is driving power or regenerative power of a motor 2, the inverter 412 being connected to the DC link that is a DC output side of the rectifier 411; and a resistance discharge unit 413 for consuming regenerative energy by conversion into thermal energy in a resistance, the resistance discharge unit 413 being connected to the DC link. In accordance with motor drive commands from a control apparatus (not illustrated), the inverter 412 converts DC power in the DC link and outputs AC power of a desired frequency for motor drive. Regenerative energy generated in the motor 2 during deceleration of the motor 2 is converted into DC power by the inverter 412, followed by further conversion into AC power by the rectifier 411 to be returned to the AC power input side including the three-phase AC input power source 3.

The resistance discharge unit 413 includes a resistance discharge part 421, a voltage detection part 422, and a discharge operation determination part 423.

Of these, the resistance discharge part 421 includes a resistance R; a switching device S for connecting the resistance R to a DC link between the rectifier 411 and the inverter 412 upon reception of commands (ON signals) for starting a resistance discharge operation from the discharge operation determination part 423 and for disconnecting the resistance R and the DC link upon reception of commands (OFF signals) for stopping the resistance discharge operation from the discharge operation determination part 423; and a reflux diode D.

Further, the voltage detection part 422 detects a voltage of a DC output side of the rectifier 411 (in other words, a voltage of a smoothing capacitor C). A detected DC voltage value is transmitted to the discharge operation determination part 423. The resistance discharge unit 413 is added on the DC link between the rectifier 411 and the inverter 412 in order to cope with the case where regenerative energy is difficult to return to the AC input side as described above. As a result, there occurs a case in which it is difficult to provide a communication interface between an existing device such as the rectifier 411 and the resistance discharge unit 413 to be added on or communication rate is low even with the communication interface. Therefore, inside the resistance discharge unit 413 to be added on, the voltage detection part 422 is provided for detecting a DC voltage in the DC link.

Further, the discharge operation determination part 423 produces commands (ON/OFF signals) for on/off-controlling the switching device S inside the resistance discharge part 421 in response to a DC voltage value detected by the voltage detection part 422.

The switching device S inside the resistance discharge part 421 is switched on or off in accordance with commands received from the discharge operation determination part 423. Thereby, the resistance R and the DC link are connected or this connection is cut off. Regenerative energy generated during deceleration of the motor 2 is converted into DC power by the inverter 412, whereby a DC voltage in the DC link (in other words, a voltage of the DC output side of the rectifier 411) increases and then upon exceeding a certain threshold value, the discharge operation determination part 423 outputs ON signals to the switching device S. As a result, the switching device S is switched on and then the resistance R is connected to the DC link, whereby the regenerative energy is consumed in the resistance R by conversion into thermal energy (resistance discharge operation start). The DC voltage in the DC link (in other words, the voltage of the DC output side of the rectifier 411) drops due to the consumption of this thermal energy, and then, upon falling below a certain threshold value, the discharge operation determination part 423 outputs OFF signals to the switching device S. As a result, the switching device S is switched off and the connection between the resistance R and the DC link is cut off, whereby the consumption of the regenerative energy in the resistance R stops (resistance discharge operation stop).

When the three-phase AC input power source on the AC input side is a generator or power fails on the AC input side, regenerative energy is difficult to return to the AC input side. When this fact is neglected, a DC voltage in the DC link exceeds voltage resistances of elements of the rectifier 411 and the inverter 412, resulting in apparatus breakage. The aforementioned discharge operation unit 413 is one unit to prevent this situation.

For example, Unexamined Japanese Patent Application Publication No. 2002-120973 discloses a technique, in which as a countermeasure against the case where power has failed on an AC input side, using a hoist for lifting an elevator and an inverter apparatus including a power consumption circuit, an elevator cargo is guided to a nearest floor with continuous braking of the elevator even upon failure on the AC input side.

Further, for example, Unexamined Japanese Patent Application Publication No. 2003-088144 discloses a technique, in which in an inverter control apparatus including a discharge resistance, a discharge control operation is executed only in cases where an inverter operation has stopped or a main power source has been cut off due to a power failure or other reasons to lower a main circuit DC bus voltage in a short period of time.

Further, for example, Unexamined Japanese Patent Application Publication No. 2006-262616 discloses a technique, in which in an inverter apparatus for consuming regenerative power from a motor using a discharge resistor disposed in a DC link portion between a rectifier and an inverter, a pre-charge contact is off-controlled upon detecting a short-circuit failure of a switching device to protect the discharge resistor from overheat and burnout due to fusing of a pre-charge registor.

Further, for example, Unexamined Japanese Patent Application Publication No. 2009-213200 discloses a technique, in which in a motor drive control system including a power regenerative unit for regenerating energy generated by a motor to a power source and a heat regenerative unit for performing conversion into heat, motor phase current is stabilized in a wide range of the number of motor rotations.

With respect to the aforementioned resistance discharge unit, it is necessary to determine a discharge capacity of the resistance discharge unit in accordance with a regenerative energy amount of a motor driven by a motor control apparatus. However, when countermeasures are intended for regenerative energy amounts of various types of motors, it is necessary to provide resistance discharge units having discharge capacities corresponding to these, resulting in that the model type of the resistance discharge units is increased and therewith, maintainability is degraded.

SUMMARY OF THE INVENTION

In view of the problems, an object of the present invention is to provide a motor control apparatus having enhanced maintenance efficiency including a resistance discharge unit for consuming regenerative energy from a motor by resistance discharge.

To realize the object, in a first aspect, a motor control apparatus includes a rectifier for rectifying AC power supplied from an AC input side to output DC power; an inverter for performing power interconversion of DC power of a DC link and AC power that is driving power or regenerative power of a motor, the inverter being connected to the DC link that is a DC output side of the rectifier; and at least two resistance discharge units each for performing resistance discharge of DC power of the DC link, the resistance discharge units each being connected to the DC link, in which each resistance discharge unit starts a resistance discharge operation for performing resistance discharge of DC power of the DC link when a DC voltage value in the DC link is larger than a first threshold value and stops the resistance discharge operation when the DC voltage value in the DC link is smaller than a second threshold value that is smaller than the first threshold value.

In a second aspect, a motor control apparatus includes a rectifier for rectifying AC power supplied from an AC input side to output DC power; an inverter for performing power interconversion of DC power of a DC link and AC power that is driving power or regenerative power of a motor, the inverter being connected to the DC link that is a DC output side of the rectifier; at least two resistance discharge units each for performing resistance discharge of DC power of the DC link, the resistance discharge units each being connected to the DC link, in which each resistance discharge unit starts a resistance discharge operation for performing resistance discharge of DC power of the DC link when a DC voltage value in the DC link is larger than a first threshold value and stops the resistance discharge operation when the DC voltage value in the DC link is smaller than a second threshold value that is smaller than the first threshold value; and a superior discharge operation command unit for commanding all the resistance discharge units to start or stop a resistance discharge operation, regardless of an operation state of the resistance discharge operation in each resistance discharge unit.

It is also possible that the superior discharge operation command unit is configured to command all the resistance discharge units to start the resistance discharge operation when any one of at least two resistance discharge units has started the resistance discharge operation from a state where neither of the at least two resistance discharge units is executing the resistance discharge operation.

It is also possible that the superior discharge operation command unit is configured to command all of the resistance discharge units to stop the resistance discharge operation when any one of at least two resistance discharge units has stopped the resistance discharge operation from a state where all of the at least two resistance discharge units are executing the resistance discharge operation.

Further, in a third aspect, a motor control apparatus includes a rectifier for rectifying AC power supplied from an AC input side to output DC power, the rectifier including a rectifier voltage detection part for detecting a DC voltage value in a DC link that is a DC output side of the rectifier; an inverter for performing power interconversion of DC power of the DC link and AC power that is driving power or regenerative power of a motor, the inverter being connected to the DC link; and at least two resistance discharge units each for performing resistance discharge of DC power of the DC link, the resistance discharge units each being connected to the DC link, in which each resistance discharge unit executes a resistance discharge operation for performing resistance discharge of DC power of the DC link when predetermined conditions are satisfied, wherein each resistance discharge unit includes a resistance discharge part for starting or stopping the resistance discharge operation for performing resistance discharge of DC power of the DC link based on a received command; a resistance discharge unit voltage detection part for detecting a DC voltage value in the DC link; a voltage correction amount calculation part for calculating a correction amount to match a DC voltage value detected by the resistance discharge unit voltage detection part to a DC voltage value detected by the rectifier voltage detection part, from a deviation between the DC voltage value detected by the rectifier voltage detection part and the DC voltage value detected by the resistance discharge unit voltage detection part; a voltage correction part for correcting the DC voltage value detected by the resistance discharge unit voltage detection part using the correction amount to produce a corrected DC voltage value; and a discharge operation determination part for commanding the resistance discharge part to start a resistance discharge operation when the corrected DC voltage value has been determined to be larger than a first threshold value and for commanding the resistance discharge part to stop the resistance discharge operation when the corrected DC voltage value has been determined to be smaller than a second threshold value that is smaller than the first threshold value.

It is also possible that the voltage correction amount calculation part is configured to calculate a correction amount before motor drive starts.

It is also possible that the voltage correction amount calculation part is configured to calculate a correction amount from a deviation between a value in which a harmonic component is removed from a DC voltage value detected by the rectifier voltage detection part and a value in which a harmonic component is removed from a DC voltage value detected by the resistance discharge unit voltage detection part.

Further, in a fourth aspect, a motor control apparatus includes a rectifier for rectifying AC power supplied from an AC input side to output DC power; an inverter for performing power interconversion of DC power of a DC link and AC power that is driving power or regenerative power of a motor, the inverter being connected to the DC link that is a DC output side of the rectifier; and at least two resistance discharge units each for performing resistance discharge of DC power of the DC link, the resistance discharge units each being connected to the DC link, in which each resistance discharge unit executes a resistance discharge operation for performing resistance discharge of DC power of the DC link when predetermined conditions are satisfied, wherein each resistance discharge unit includes a resistance discharge part for starting or stopping the resistance discharge operation for performing resistance discharge of DC power of the DC link based on a received command; a voltage detection part for detecting a DC voltage value in the DC link; a temperature information production part for producing temperature information indicating a temperature in the resistance discharge part; a discharge operation condition setting part for setting a first threshold value that is a resistance discharge operation start level based on temperature information; and a discharge operation determination part for commanding the resistance discharge part to start a resistance discharge operation when a DC voltage value detected by the voltage detection part has been determined to be larger than the first threshold value and for commanding the resistance discharge part to stop the resistance discharge operation when the DC voltage value detected by the voltage detection part has been determined to be smaller than a second threshold value that is smaller than the first threshold value.

It is also possible that the discharge operation condition setting part is configured to set a second threshold value that is a resistance discharge operation stop level based on temperature information.

It is also possible that the discharge operation condition setting part is configured to perform resetting by sequentially changing a first threshold value alone or both of first and second threshold values to a higher level as a temperature indicated by temperature information increases in the case where a temperature indicated by the temperature information is higher than a base temperature.

It is also possible that the discharge operation condition setting part is configured to further reset the first threshold value having been reset at the higher level to a first threshold value corresponding to the base temperature or to further reset both of the first and second threshold values having been reset at the higher level to first and second threshold values corresponding to the base temperature when the temperature indicated by the temperature information has dropped and then returned to the base temperature.

It is also possible that the resistance discharge part is configured by including a resistance and a switching device for connecting the resistance to the DC link when receiving a command for starting a resistance discharge operation from the discharge operation determination part and for disconnecting the resistance and the DC link when receiving a command for stopping the resistance discharge operation from the discharge operation determination part.

It is also possible that the resistance discharge part is configured to include a thermistor disposed in a vicinity of at least either of the resistance and the switching device to cause the temperature information production part to produce temperature information based on an output of the thermistor.

It is also possible that the temperature information production part is configured to produce temperature information based on a DC voltage value detected by the voltage detection part and a command output by the discharge operation determination part.

BRIEF DESCRIPTION OF THE DRAWINGS

The present invention will be understood more clearly with reference to the following accompanying drawings.

FIG. 2a is a chart illustrating an imbalance of a resistance discharge operation in the motor control apparatus according to the first embodiment illustrated in FIG. 1, the chart illustrating a relationship between a resistance discharge operation start level and a resistance discharge operation stop level and a DC voltage in a DC link;

FIG. 2b is a chart illustrating an imbalance of a resistance discharge operation in the motor control apparatus according to the first embodiment illustrated in FIG. 1, the chart illustrating the execution and stop of the resistance discharge operation;

FIG. 5 is a chart illustrating a determination of the start of a resistance discharge operation by a superior discharge operation command unit in the motor control apparatus according to the second embodiment;

FIG. 6 is a chart illustrating a determination of the stop of a resistance discharge operation by the superior discharge operation command unit in the motor control apparatus according to the second embodiment;

FIG. 9a is a chart illustrating a resistance discharge operation in the motor control apparatus according to the third embodiment illustrated in FIG. 7, the chart illustrating a relationship between a resistance discharge operation start level and a resistance discharge operation stop level and a DC voltage in a DC link;

FIG. 9b is a chart illustrating a resistance discharge operation in the motor control apparatus according to the third embodiment illustrated in FIG. 7, the chart illustrating the execution and stop of the resistance discharge operation;

FIG. 14a is a chart illustrating a resistance discharge operation in the motor control apparatus according to the fourth embodiment illustrated in FIG. 10 to FIG. 12, the chart illustrating a relationship between a resistance discharge operation start level and a resistance discharge operation stop level and a DC voltage in a DC link;

FIG. 14b is a chart illustrating a resistance discharge operation in the motor control apparatus according to the fourth embodiment illustrated in FIG. 10 to FIG. 12, the chart illustrating the execution and stop of the resistance discharge operation.

DETAILED DESCRIPTION

With reference to the drawings, a motor control apparatus including at least two resistance discharge units will now be described. However, it should be understood that the present invention is not limited to the drawings and the embodiments described below.

Figure 1:
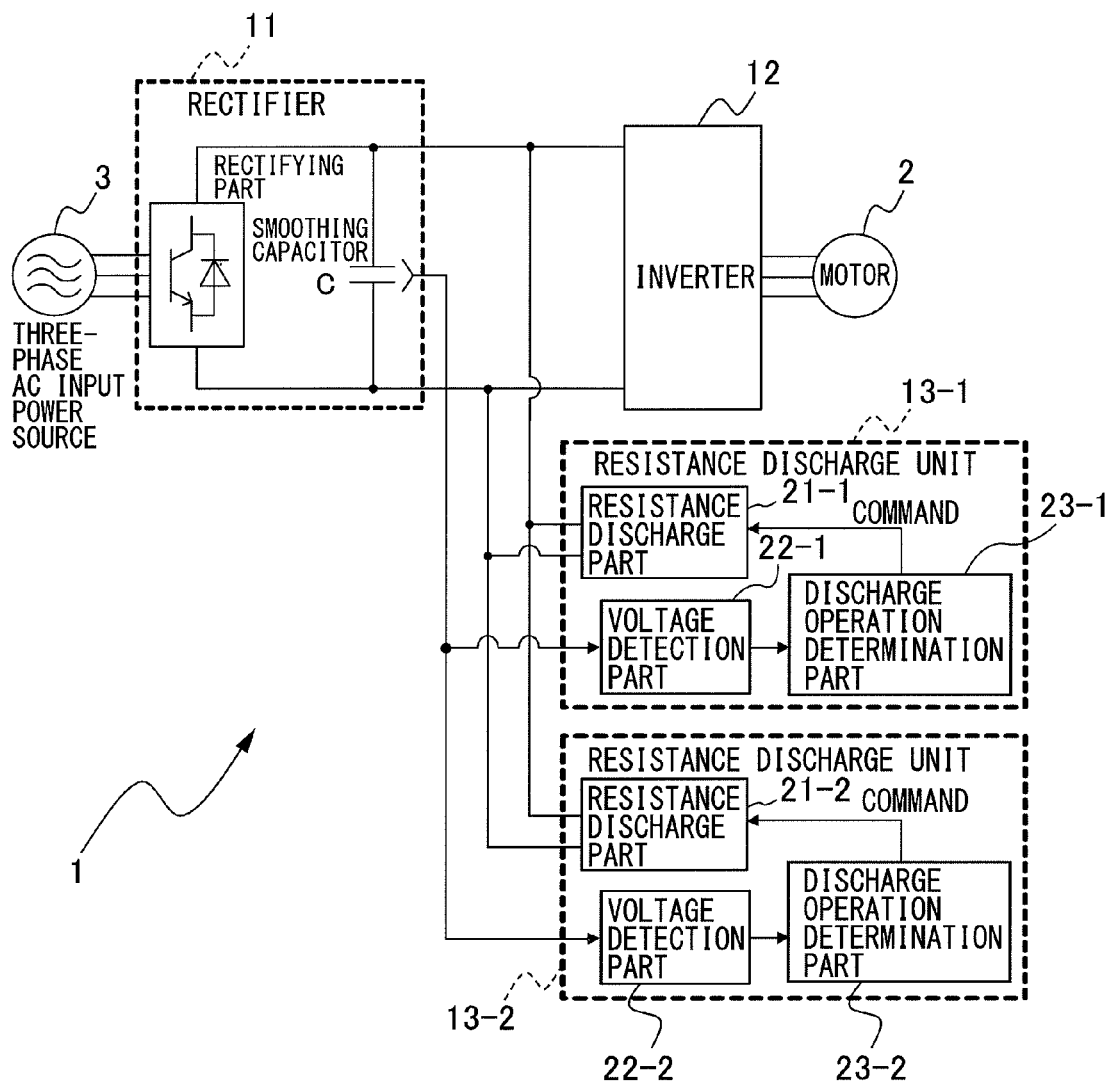
FIG. 1 is a diagram illustrating a configuration of a motor control apparatus according to a first embodiment.

FIG. 1 is a diagram illustrating a configuration of a motor control apparatus according to a first embodiment. A motor control apparatus 1 illustrated in FIG. 1 includes at least two resistance discharge units. In other words, the motor control apparatus 1 includes a rectifier 11 for rectifying AC power supplied from an AC input side including a three-phase AC input power source 3 to output DC power; an inverter 12 for performing power interconversion of DC power of a DC link and AC power that is driving power or regenerative power of a motor 2, the inverter 12 being connected to the DC link that is a DC output side of the rectifier 11; and at least two resistance discharge units (represented by reference numbers 13-1 and 13-2 in the figure) each for performing resistance discharge of DC power of the DC link, the resistance discharge units each being connected to the DC link, in which each resistance discharge unit starts a resistance discharge operation for performing resistance discharge of DC power of the DC link when a DC voltage value in the DC link is larger than a first threshold value and stops the resistance discharge operation when the DC voltage value in the DC link is smaller than a second threshold value that is smaller than the first threshold value. Herein, in FIG. 1, the number of resistance discharge units has been set to be 2 as one example. However, in actual operations, the number of the resistance discharge units is determined so as to correspond to an estimated regenerative energy amount.

These resistance discharge units 13-1 and 13-2 each include an individual resistance discharge part, voltage detection part, and discharge operation determination part. In other words, the resistance discharge unit 13-1 includes a resistance discharge part 21-1, a voltage detection part 22-1, and a discharge operation determination part 23-1, and the resistance discharge unit 13-2 includes a resistance discharge part 21-2, a voltage detection part 22-2, and a discharge operation determination part 23-2. The resistance discharge part 21-1 starts or stops a resistance discharge operation for performing resistance discharge of DC power of the DC link based on a received command. The voltage detection part 22-1 detects a DC voltage value in the DC link. The discharge operation determination part 23-1 commands the resistance discharge part 21-1 to start a resistance discharge operation when having determined a DC voltage value detected by the voltage detection part 22-1 to be larger than a first threshold value and commands the resistance discharge part 21-1 to stop the resistance discharge operation when having determined the DC voltage value detected by the voltage detection part 22-1 to be smaller than a second threshold value. In the same manner, the resistance discharge part 21-2 starts or stops a resistance discharge operation for performing resistance discharge of DC power of the DC link based on a received command. The voltage detection part 22-2 detects a DC voltage value in the DC link. The discharge operation determination part 23-2 commands the resistance discharge part 21-2 to start a resistance discharge operation when having determined a DC voltage value detected by the voltage detection part 22-2 to be larger than a first threshold value and commands the resistance discharge part 21-2 to stop the resistance discharge operation when having determined the DC voltage value detected by the voltage detection part 22-2 to be smaller than a second threshold value. Herein, as described with reference to FIG. 15, the resistance discharge parts 21-1 and 21-2 each include a resistance (not illustrated in FIG. 1) and a switching device (not illustrated in FIG. 1) for connecting the resistance to the DC link upon reception of a command for starting a resistance discharge operation from the discharge operation determination parts 23-1 and 23-2 and for disconnecting the resistance and the DC link upon reception of a command for stopping the resistance discharge operation from the discharge operation determination parts 23-1 and 23-2, respectively. The resistance discharge units 13-1 and 13-2 each operate independently based on a DC voltage value detected by the voltage detection parts 22-1 and 22-2 included therein, respectively. When a detected DC voltage value has been larger than the first threshold value, a resistance discharge operation starts and thereafter a DC voltage value to be detected gradually decreases by resistance discharge, and when a detected DC voltage value has been smaller than the second threshold value, the resistance discharge operation stops. Herein, the first threshold value is appropriately set in view of a maximum voltage of each component and others. Further, the second threshold value is appropriately set in view of heat generated by switching operations of a switching device in the inverter 12, a control cycle, and others.

When a plurality of resistance discharge units are used, it is possible that there may occur an imbalance (bias) of an operation state-such that a load is applied to a specific resistance discharge unit due to a voltage detection error of each resistance discharge unit. As a result, a load-concentrated resistance discharge unit generates a large amount of heat, which makes it possible to decrease a discharge capacity of the entire system having the plurality of resistance discharge units. More detailed description on this fact will be made with reference to FIG. 2a and FIG. 2b, as follows.

FIG. 2a is a chart illustrating an imbalance of a resistance discharge operation in the motor control apparatus according to the first embodiment illustrated in FIG. 1, and the chart illustrates a relationship between a resistance discharge operation start level and a resistance discharge operation stop level and a DC voltage in a DC link. FIG. 2b is a chart illustrating an imbalance of a resistance discharge operation in the motor control apparatus according to the first embodiment illustrated in FIG. 1, and the chart illustrates the execution and stop of the resistance discharge operation. The resistance discharge units 13-1 and 13-2 of FIG. 1 are expressed as a first resistance discharge unit and a second resistance discharge unit, respectively, in FIG. 2a and FIG. 2b.

There are errors in a resistance discharge operation start level and a resistance discharge operation stop level between resistance discharge units. Here, as one example, as illustrated in FIG. 2a, a description will be given for a case in which a resistance discharge operation start level and a resistance discharge operation stop level of the second resistance discharge unit are higher than a resistance discharge operation start level and a resistance discharge operation stop level of the first resistance discharge unit.

In the case where an amount of regenerative energy consumable in any one of the first resistance discharge unit and the second resistance discharge unit is regenerated from the motor 2, a resistance discharge operation is described as follows. Initially, when regenerative energy generated in the motor 2 is converted into DC power by the inverter 12, then a DC voltage in a DC link between the rectifier 11 and the inverter 12 starts to rise. Then, when the DC voltage in the DC link rises up to the resistance discharge operation start level of the first resistance discharge unit, then the first resistance discharge unit starts a resistance discharge operation. Since in the description herein, an amount of regenerative energy has been assumed to be completely consumed by one resistance discharge unit, the DC voltage in the DC link is turned into a drop by the start of the resistance discharge operation by the first resistance discharge unit. When the DC voltage in the DC link drops down to the resistance discharge operation stop level of the first resistance discharge unit, then the first resistance discharge unit stops the resistance discharge operation. In this manner, there is a possibility that an imbalance of an operation state such that the first resistance discharge unit executes a resistance discharge operation but the second resistance discharge unit executes no resistance discharge operation, may occur. When the aforementioned regenerative energy has continued to be generated in the motor 2, the second resistance discharge unit still executes no resistance discharge operation and only the first resistance discharge unit executes the resistance discharge operation. Therefore, the first resistance discharge unit becomes larger than the second resistance discharge unit in an amount of heat generation. As a result, even in the case where two resistance discharge units are provided, when an error occurs between the resistance discharge units with respect to the resistance discharge operation start level and the resistance discharge operation stop level, it is possible that although an amount of regenerative energy is an amount to the extent of being completely consumed by the two resistance discharge units, a load is concentrated on a specific resistance discharge unit and then an allowable temperature of the resistance discharge unit is exceeded, resulting in a decrease in a discharge capacity of the entire system including the plurality of resistance discharge units. Therefore, in the second, third, and fourth embodiments to be described below, there are provided elements such that a possibility of imbalance occurrence in discharge operations of the respective resistance discharge units in the first embodiment is removed and the amounts of heat generation of the respective resistance discharge units are equalized.

Figure 3:
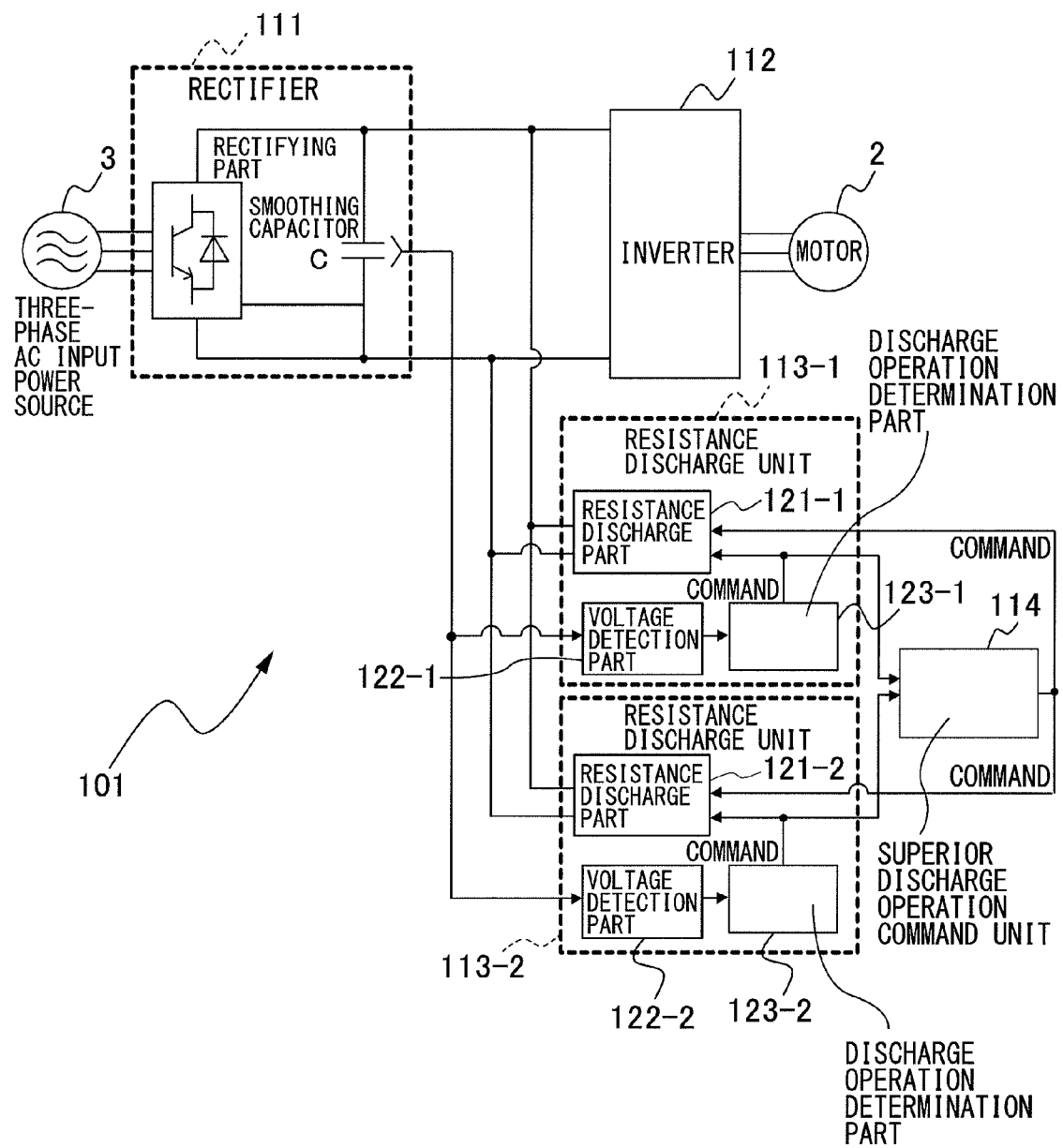
FIG. 3 is a diagram illustrating a configuration of a motor control apparatus according to a second embodiment.

FIG. 3 is a diagram illustrating a configuration of a motor control apparatus according to the second embodiment. Hereinafter, the same reference symbols in different drawings are applied to elements having the same functions. A motor control apparatus 101 according to the second embodiment includes a rectifier 111, an inverter 112, at least two resistance discharge units 113-1 and 113-2, and a superior discharge operation command unit 114. In FIG. 3, as one example, the number of resistance discharge units has been set to be 2 but the number of the resistance discharge units does not limit the present invention. Another number is employable as long as it is more than 1.

The rectifier 111 rectifies AC power supplied from an AC input side including a three-phase AC input power source 3 to output DC power. In the second embodiment, the embodiment of the rectifier ill used is not specifically limited and for example, a 120-degree conductive rectifying circuit or a rectifying circuit of a PWM control type is employable.

The rectifier 111 and the inverter 112 are connected together via the DC link. The inverter 112 is configured as a conversion circuit including a switching device therein, such as a PWM inverter and the like. The inverter 112 converts DC power input from a DC input side including the DC link into three-phase AC power having a desired voltage and a desired frequency for switching-operating the inner switching device and for driving the motor 2 based on a motor drive command received from a superior control apparatus (not illustrated). The motor 2 operates based on supplied three-phase AC power being voltage-variable and frequency-variable. Further, during deceleration of the motor 2, regenerative power is generated, and based on the motor drive command received from the superior control apparatus, AC power that is the regenerative power generated in the motor 2 is converted into DC power to be then returned to the DC link. In this manner, the inverter 112 performs power interconversion of DC power in the DC link and AC power that is driving power or regenerative power of the motor 2 based on a received motor drive command. Herein, the drive control of a single motor 2 by the motor control apparatus 101 is being dealt with as an example. However, the number of motors does not limit the present invention and another number is employable. In the case where a plurality of motors are provided, a respective inverter 112 is provided for each motor.

The motor control apparatus 101 includes at least two resistance discharge units 113-1 and 113-2. The resistance discharge units 113-1 and 113-2 each are connected to the DC link to perform resistance discharge of DC power of the DC link. The resistance discharge units 113-1 and 113-2 each start a resistance discharge operation for performing resistance discharge of DC power of the DC link when a DC voltage value in the DC link is larger than a first threshold value and stop the resistance discharge operation when the DC voltage value in the DC link is smaller than a second threshold value that is smaller than the first threshold value.

These resistance discharge units 113-1 and 113-2 each include an individual resistance discharge part, voltage detection part, and discharge operation determination part.

In other words, the resistance discharge unit 113-1 includes a resistance discharge part 121-1, a voltage detection part 122-1, and a discharge operation determination part 123-1. The resistance discharge part 121-1 starts or stops a resistance discharge operation for performing resistance discharge of DC power of the DC link based on a received command. The voltage detection part 122-1 detects a DC voltage value in the DC link. The discharge operation determination part 123-1 commands the resistance discharge part 121-1 to start a resistance discharge operation when having determined a DC voltage value detected by the voltage detection part 122-1 to be larger than a first threshold value and commands the resistance discharge part 121-1 to stop the resistance discharge operation when having determined the DC voltage value detected by the voltage detection part 122-1 to be smaller than a second threshold value.

In the same manner, the resistance discharge unit 113-2 includes a resistance discharge part 121-2, a voltage detection part 122-2, and a discharge operation determination part 123-2. The resistance discharge part 121-2 starts or stops a resistance discharge operation for performing resistance discharge of DC power of the DC link based on a received command. The voltage detection part 122-2 detects a DC voltage value in the DC link. The discharge operation determination part 123-2 commands the resistance discharge part 121-2 to start a resistance discharge operation when having determined a DC voltage value detected by the voltage detection part 122-2 to be larger than a first threshold value and commands the resistance discharge part 121-2 to stop the resistance discharge operation when having determined the DC voltage value detected by the voltage detection part 122-2 to be smaller than a second threshold value.

Figure 15:
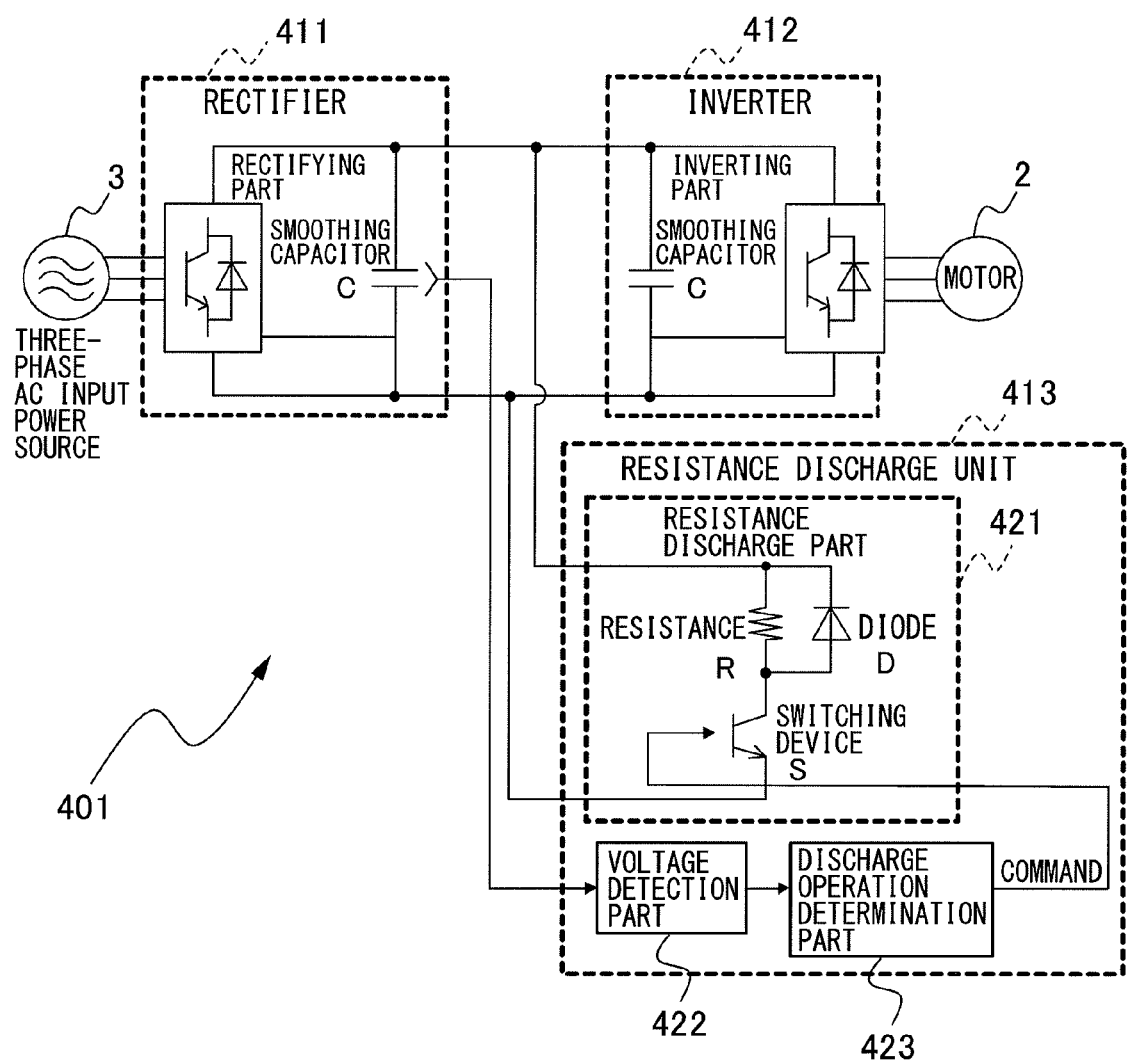
FIG. 15 is a diagram illustrating a configuration of a general motor control apparatus including a resistance discharge unit.

Herein, as described with reference to FIG. 15, the resistance discharge parts 121-1 and 121-2 each include a resistance (not illustrated in FIG. 3) and a switching device (not illustrated in FIG. 3) for connecting the resistance to the DC link upon reception of a command for starting a resistance discharge operation from the discharge operation determination parts 123-1 and 123-2 and for disconnecting the resistance and the DC link upon reception of a command for stopping the resistance discharge operation from the discharge operation determination parts 123-1 and 123-2, respectively.

As described above, at least two resistance discharge units are provided (represented by reference numbers 113-1 and 113-2 in the example illustrated in FIG. 3) but only a single superior discharge operation command unit 114 is provided as a superordinate for these resistance discharge units 113-1 and 113-2. The superior discharge operation command unit 114 commands all the resistance discharge units 113-1 and 113-2 to start or stop a resistance discharge operation, regardless of an operation state of a resistance discharge operation in each of the resistance discharge units 113-1 and 113-2. When any one of at least two resistance discharge units 113-1 and 113-2 has started a resistance discharge operation from a state where neither of the at least two resistance discharge units 113-1 and 113-2 is executing the resistance discharge operation, the superior discharge operation command unit 114 commands all the resistance discharge units 113-1 and 113-2 to start the resistance discharge operation. Further, when any one of the at least two resistance discharge units 113-1 and 113-2 has stopped the resistance discharge operation from a state where all of the at least two resistance discharge units 113-1 and 113-2 are executing the resistance discharge operation, the superior discharge operation command unit 114 commands all the resistance discharge units 113-1 and 113-2 to stop.

Figures 4A, 4B:
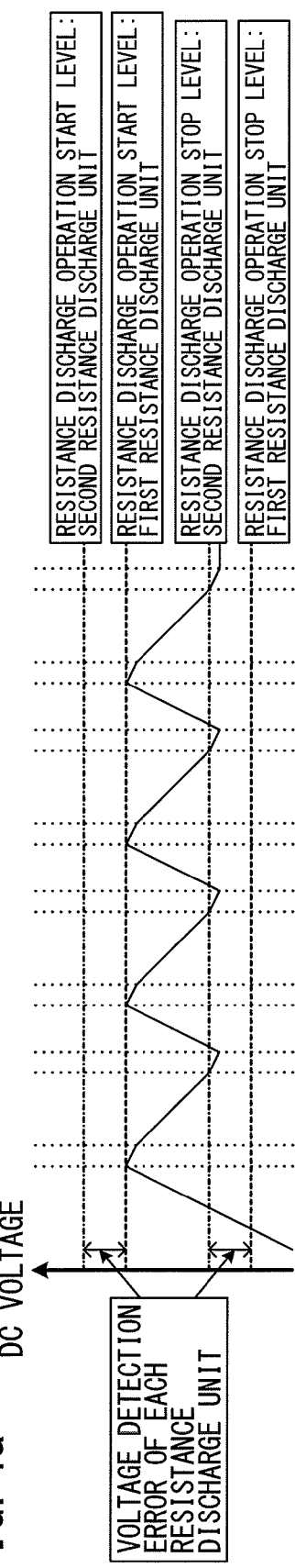
FIG. 4a is a chart illustrating a resistance discharge operation in the motor control apparatus according to the second embodiment illustrated in FIG. 3, the chart illustrating a relationship between a resistance discharge operation start level and a resistance discharge operation stop level and a DC voltage in a DC link.
FIG. 4b is a chart illustrating a resistance discharge operation in the motor control apparatus according to the second embodiment illustrated in FIG. 3, the chart illustrating the execution and stop of the resistance discharge operation.

Next, an operation of the superior discharge operation command unit 114 will be described with reference to FIG. 4a and FIG. 4b. FIG. 4a is a chart illustrating a resistance discharge operation in the motor control apparatus according to the second embodiment illustrated in FIG. 3, and the chart illustrates a relationship between a resistance discharge operation start level and a resistance discharge operation stop level and a DC voltage in a DC link. FIG. 4b is a chart illustrating a resistance discharge operation in the motor control apparatus according to the second embodiment illustrated in FIG. 3, and the chart illustrates the execution and stop of the resistance discharge operation. The resistance discharge units 113-1 and 113-2 of FIG. 3 are expressed as a first resistance discharge unit and a second resistance discharge unit, respectively, in FIG. 4a and FIG. 4b.

There are errors in the resistance discharge operation start level and the resistance discharge operation stop level between the resistance discharge units. As one example, as illustrated in FIG. 4a, a description will be given for on a case in which a resistance discharge operation start level (a first threshold value) and a resistance discharge operation stop level (a second threshold value) of the second resistance discharge unit are higher than a resistance discharge operation start level (a first threshold value) and a resistance discharge operation stop level (a second threshold value) of the first resistance discharge unit.

In the case where an amount of regenerative energy consumable in any one of the first resistance discharge unit and the second resistance discharge unit is regenerated from the motor 2, a resistance discharge operation is described as follows. Initially, when regenerative energy generated in the motor 2 is converted into DC power by the inverter 112 while neither of the resistance discharge units (the resistance discharge units 113-1 and 113-2 of FIG. 3) executes a resistance discharge operation, a DC voltage in a DC link between the rectifier 111 and the inverter 112 starts to rise.

Then, when the DC voltage in the DC link detected by a voltage detection unit rises up to the resistance discharge operation start level (the first threshold value) of the first resistance discharge unit, the first resistance discharge unit starts a resistance discharge operation. Since regenerative energy is consumable by a single resistance discharge unit, as illustrated in FIG. 4a, the DC voltage in the DC link is turned into a drop by the resistance discharge operation executed by the first resistance discharge unit.

Since the resistance discharge operation has started in the first resistance discharge unit (the resistance discharge unit 113-1 of FIG. 3) of the first resistance discharge unit (the resistance discharge unit 113-1 of FIG. 3) and the second resistance discharge unit (the resistance discharge unit 113-2 of FIG. 3), the superior discharge operation command unit 114 commands both of the first resistance discharge unit and the second resistance discharge unit to start the resistance discharge operation. With respect to determining which one of the first resistance discharge unit and the second resistance discharge unit has started the resistance discharge operation, since each resistance discharge unit issues a command for starting a resistance discharge operation on its own when a DC voltage detected by a corresponding voltage detection unit has reached the resistance discharge operation start level (the first threshold value), monitoring of the command by the superior discharge operation command unit 114 makes it possible to detect the presence or absence of a resistance discharge unit having started the resistance discharge operation.

The superior discharge operation command unit 114 commands all of the first resistance discharge unit and the second resistance discharge unit to start the resistance discharge operation, and then as illustrated in FIG. 4b, not only the first resistance discharge unit but also the second resistance discharge unit start the resistance discharge operation. Herein, the reason why the second resistance discharge unit starts the resistance discharge operation later than the first resistance discharge unit as illustrated in FIG. 4b is that in the example described here, since after detecting the start of the resistance discharge operation of the first resistance discharge unit, the superior discharge operation command unit 114 commands the first resistance discharge unit and the second resistance discharge unit to start the resistance discharge operation, a slight time delay occurs until the second resistance discharge unit starts the resistance discharge operation. The resistance discharge operation of the second resistance discharge unit is executed later than the resistance discharge operation of the first resistance discharge unit alone in this manner, resulting in a difference in a temporal drop rate of the DC voltage in the DC link as illustrated in FIG. 4a.

The DC voltage in the DC link continues to drop and then reaches the resistance discharge operation stop level (the second threshold value) of the second resistance discharge unit. In the example described here, since the resistance discharge operation stop level (the second threshold value) of the second resistance discharge unit is higher than the resistance discharge operation stop level (the second threshold value) of the first resistance discharge unit, the resistance discharge operation stop level (the second threshold value) of the second resistance discharge unit is reached early. When the aforementioned DC voltage drops down to the resistance discharge operation stop level (the second threshold value) of the second resistance discharge unit, the second resistance discharge unit stops the resistance discharge operation.

Since the resistance discharge operation has stopped in the second resistance discharge unit in this manner, the superior discharge operation command unit 114 commands both of the first resistance discharge unit and the second resistance discharge unit to stop the resistance discharge operation. Herein, since each resistance discharge unit issues a command for stopping the resistance discharge operation on its own when a DC voltage detected by a corresponding voltage detection unit has reached the resistance discharge operation stop level (the second threshold value), monitoring of the command by the superior discharge operation command unit 114 makes it possible to detect the presence or absence of a resistance discharge unit having stopped the resistance discharge operation, in other words, to determine which one of the first resistance discharge unit and the second resistance discharge unit has stopped the resistance discharge operation.

When the superior discharge operation command unit 114 commands both of the first resistance discharge unit and the second resistance discharge unit to stop the resistance discharge operation, the first resistance discharge unit stops the resistance discharge operation in addition to the second resistance discharge unit as illustrated in FIG. 4b. Herein, the reason why the first resistance discharge unit stops the resistance discharge operation later than the second resistance discharge unit as illustrated in FIG. 4b is that in the example described here, since after detecting the stop of the resistance discharge operation of the second resistance discharge unit, the superior discharge operation command unit 114 commands the first resistance discharge unit and the second resistance discharge unit to stop the resistance discharge operation, a slight time delay occurs until the first resistance discharge unit stops the resistance discharge operation. The stop of the resistance discharge operation of the first resistance discharge unit is realized later than the resistance discharge operation stopped by the second resistance discharge unit alone in this manner, resulting in a difference in a temporal drop rate of the DC voltage in the DC link as illustrated in FIG. 4a.

When the aforementioned regenerative energy continues to be generated in the motor 2, the aforementioned processing causes both the first resistance discharge unit and the second resistance discharge unit to execute a resistance discharge operation and therefore, an imbalance of an operation state where no resistance discharge operation is executed by either of the resistance discharge units is removed. In this manner, according to the second embodiment, when the superior discharge operation command unit for commanding all the resistance discharge units to start or stop a resistance discharge operation is provided, an imbalance between the discharge operations of the respective resistance discharge units is removed and the amounts of heat generation of the respective resistance discharge units are equalized, regardless of an operation state of the resistance discharge operation in each resistance discharge unit. As a result, a case where an allowable temperature is exceeded in only a single resistance discharge unit does not occur, which makes it possible to prevent a discharge capacity of an entire system including a plurality of resistance discharge units from decreasing.

Next, with respect to determining which one of at least two resistance discharge units starts or stops a resistance discharge operation using the superior discharge operation command unit 114 as described above, one example of a specific determination method will be described. FIG. 5 is a chart illustrating a determination of the start of a resistance discharge operation by the superior discharge operation command unit in the motor control apparatus according to the second embodiment, and FIG. 6 is a chart illustrating a determination of the stop of the resistance discharge operation by the superior discharge operation command unit in the motor control apparatus according to the second embodiment.

In FIG. 5 and FIG. 6, with respect to an operation state of a resistance discharge operation in the resistance discharge unit, running (or being started) is expressed as "1 (true)" and being under suspension is expressed as "0 (false)). Further, with respect to a determination result by the superior discharge operation command unit 114, all the resistance discharge units each are commanded to start a resistance discharge operation at 1 (true) but no command is issued thereto at 0 (false). In the same manner, all the resistance discharge units each are commanded to stop the resistance discharge operation at 0 (false) but no command is issued thereto at 1 (true).

A determination of which one of at least two resistance discharge units has started a resistance discharge operation using the superior discharge operation command unit 114 will be described below. The superior discharge operation command unit 114 determines the necessity of a command to all the resistance discharge units for starting a resistance discharge operation by calculating a logical sum of the operation states of all the resistance discharge units. In other words, when neither of the resistance discharge units is executing the resistance discharge operation, a logical sum of the operation states of these resistance discharge units is "0 (false)", but when any one of the resistance discharge units starts the resistance discharge operation, the operation state of the resistance discharge unit having started the running operation becomes "1 (true)", and therefore a calculated logical sum of the operation states of a plurality of resistance discharge units becomes "1 (true)". In other words, as illustrated in FIG. 5, when at least one of the operation states of the plurality of resistance discharge units is "1 (true)", a logical sum thereof becomes "1 (true)". Therefore, when determining that the logical sum has been switched from "0 (false)" to "1 (true)", the superior discharge operation command unit 114 commands all the resistance discharge units to start the resistance discharge operation. Thereby, all the resistance discharge units execute the resistance discharge operation and the operation state of each resistance discharge unit indicates "1 (true)". On the other hand, when the operation states of all the plurality of resistance discharge units are "0 (false)", a logical sum thereof becomes "0 (false)" and therefore, the superior discharge operation command unit 114 issues no command for starting the resistance discharge operation.

A determination of which one of at least two resistance discharge units has stopped a resistance discharge operation using the superior discharge operation command unit 114 will be described below. The superior discharge operation command unit 114 determines the necessity of a command to all the resistance discharge units for stopping a resistance discharge operation by calculating a logical product of the operation states of all the resistance discharge units. When all the resistance discharge units are executing the resistance discharge operation, the operation state of each resistance discharge unit is "1 (true)". At that time, when any one of the resistance discharge units stops the resistance discharge operation, the operation state of the resistance discharge unit having stopped the running operation becomes "0 (false)", and a calculated logical product of the operation states of a plurality of resistance discharge units becomes "0 (false)". In other words, as illustrated in FIG. 6, when at least one of the operation states of the plurality of resistance discharge units is "0 (false)", a logical product thereof becomes "0 (false)". Therefore, when determining that the logical product has been switched from "1 (true)" to "0 (false)", the superior discharge operation command unit 114 commands all the resistance discharge units to stop the resistance discharge operation. Thereby, all of the resistance discharge units stop the resistance discharge operation and the operation state of each resistance discharge unit indicates "0 (false)". On the other hand, when the operation states of all the plurality of resistance discharge units remain "1 (true)", a logical product thereof becomes "1 (true)" and therefore, the superior discharge operation command unit 114 issues no command for stopping the resistance discharge operation.

Figure 7:
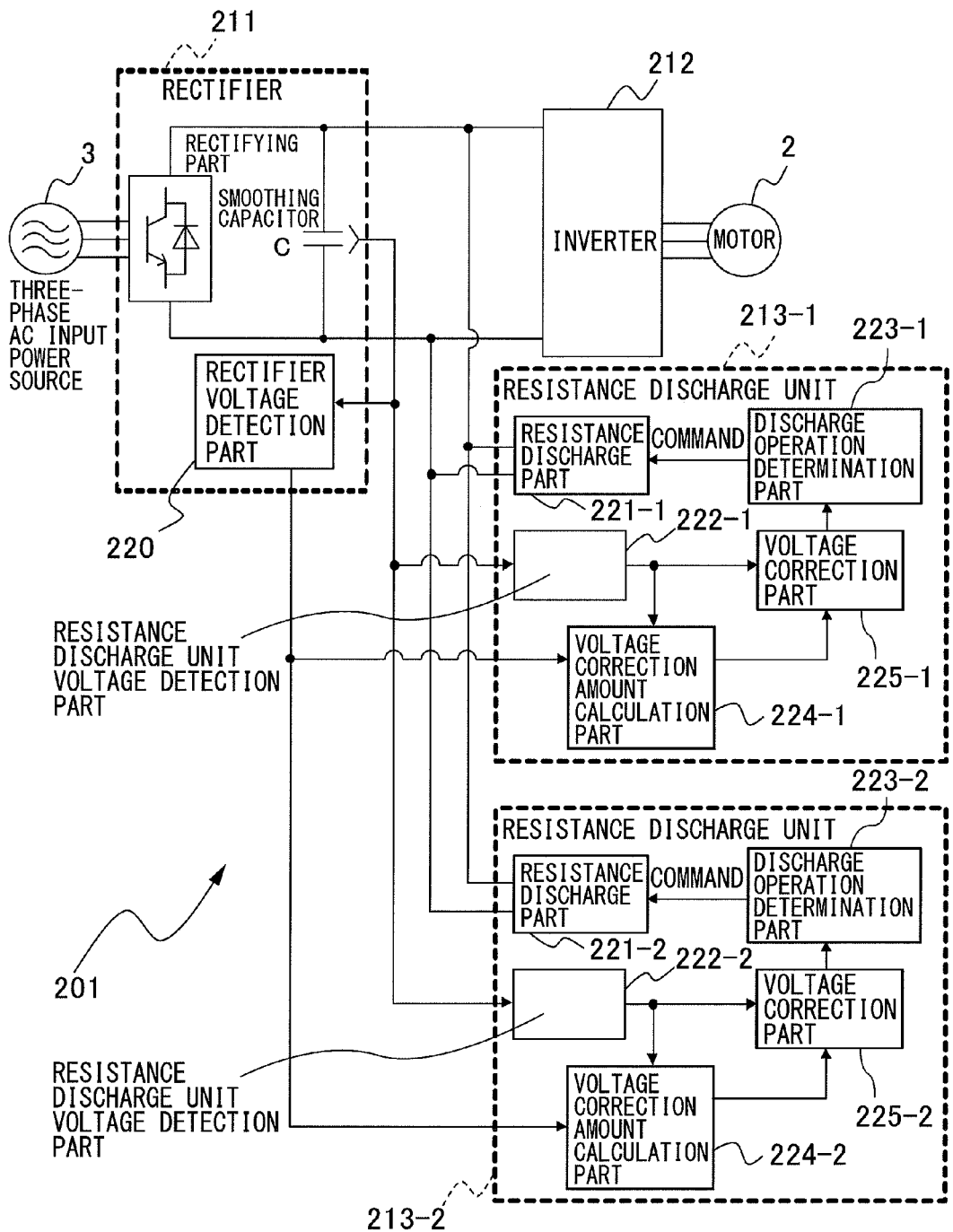
FIG. 7 is a diagram illustrating a configuration of a motor control apparatus according to a third embodiment.

Next, the motor control apparatus according to the third embodiment will be described with reference to FIG. 7, FIG. 8, FIG. 9a, and FIG. 9b. FIG. 7 is a diagram illustrating a configuration of the motor control apparatus according to the third embodiment. A motor control apparatus 201 according to the third embodiment includes a rectifier 211, an inverter 212, and at least two resistance discharge units 213-1 and 213-2. Herein, in FIG. 7, as one example, the number of resistance discharge units has been set to be 2. However, the number of the resistance discharge units does not limit the present invention and another number is employable as long as it is more than 1.

The rectifier 211 rectifies AC power supplied from an AC input side including a three-phase AC input power source 3 to output DC power. Further, the rectifier 211 includes a rectifier voltage detection part 220 for detecting a DC voltage value in a DC link that is a DC output side of the rectifier 211. In the third embodiment, the embodiment of the rectifier 211 used is not specifically limited and, for example, a 120-degree conductive rectifying circuit or a rectifying circuit of a PWM control type is employable.

The rectifier 211 and the inverter 212 are connected together via the DC link. The inverter 212 is configured as a conversion circuit including a switching device therein, such as a PWM inverter and the like. The inverter 212 converts DC power input from a DC input side including the DC link into three-phase AC power having a desired voltage and a desired frequency for switching-operating the inner switching device and for driving the motor 2 based on a motor drive command received from a superior control apparatus (not illustrated). The motor 2 operates based on supplied three-phase AC power being voltage-variable and frequency-variable. Further, during deceleration of the motor 2, regenerative power is generated, and based on the motor drive command received from the superior control apparatus, AC power that is the regenerative power generated in the motor 2 is converted into DC power to be then returned to the DC link. In this manner, the inverter 212 performs power interconversion of DC power in the DC link and AC power that is driving power or regenerative power of the motor 2 based on the received motor drive command. Herein, the drive control of a single motor 2 by the motor control apparatus 201 is being dealt with as an example. However, the number of motors does not limit the present invention and another number is employable. In the case of a plurality of motors 2 provided, a respective inverter 212 is provided for each motor 2.

The motor control apparatus 201 includes at least two resistance discharge units 213-1 and 213-2. The resistance discharge units 213-1 and 213-2 each are connected to the DC link to perform resistance discharge of DC power of the DC link. The resistance discharge units 213-1 and 213-2 each execute a resistance discharge operation for performing resistance discharge of DC power of the DC link when predetermined conditions are satisfied.

These resistance discharge units 213-1 and 213-2 each include an individual resistance discharge part, resistance discharge unit voltage detection part, discharge operation determination part, voltage correction amount calculation part, and voltage correction part.

In other words, the resistance discharge unit 213-1 includes a resistance discharge part 221-1, a resistance discharge unit voltage detection part 222-1, a discharge operation determination part 223-1, a voltage correction amount calculation part 224-1, and a voltage correction part 225-1. The resistance discharge part 221-1 starts or stops a resistance discharge operation for performing resistance discharge of DC power of the DC link based on a received command. The resistance discharge unit voltage detection part 222-1 detects a DC voltage value in the DC link. The voltage correction amount calculation part 224-1 calculates a correction amount to match a DC voltage value detected by the resistance discharge unit voltage detection part 222-1 to a DC voltage value detected by the rectifier voltage detection part 220 from a deviation between the DC voltage value detected by the rectifier voltage detection part 220 and the DC voltage value detected by the resistance discharge unit voltage detection part 222-1. The voltage correction part 225-1 corrects the DC voltage value detected by the resistance discharge unit voltage detection part 222-1 using the correction amount to produce a corrected DC voltage value. The discharge operation determination part 223-1 commands the resistance discharge part 221-1 to start the resistance discharge operation when having determined the corrected DC voltage value to be larger than a first threshold value and commands the resistance discharge part 221-1 to stop the resistance discharge operation when having determined the corrected DC voltage value to be smaller than a second threshold value that is smaller than the first threshold value.

In the same manner, the resistance discharge unit 213-2 includes a resistance discharge part 221-2, a resistance discharge unit voltage detection part 222-2, a discharge operation determination part 223-2, a voltage correction amount calculation part 224-2, and a voltage correction part 225-2. The resistance discharge part 221-2 starts or stops a resistance discharge operation for performing resistance discharge of DC power of the DC link based on a received command. The resistance discharge unit voltage detection part 222-2 detects a DC voltage value in the DC link. The voltage correction amount calculation part 224-2 calculates a correction amount to match a DC voltage value detected by the resistance discharge unit voltage detection part 222-2 to a DC voltage value detected by the rectifier voltage detection part 220 from a deviation between the DC voltage value detected by the rectifier voltage detection part 220 and the DC voltage value detected by the resistance discharge unit voltage detection part 222-2. The voltage correction part 225-2 corrects the DC voltage value detected by the resistance discharge unit voltage detection part 222-2 using the correction amount to produce a corrected DC voltage value. The discharge operation determination part 223-2 commands the resistance discharge part 221-2 to start a resistance discharge operation when having determined the corrected DC voltage value to be larger than a first threshold value and commands the resistance discharge part 221-2 to stop the resistance discharge operation when having determined the corrected DC voltage value to be smaller than a second threshold value that is smaller than the first threshold value.

Herein, as described with reference to FIG. 15, the resistance discharge parts 221-1 and 221-2 each include a resistance (not illustrated in FIG. 7) and a switching device (not illustrated in FIG. 7) for connecting the resistance to the DC link upon reception of a command for starting a resistance discharge operation from the discharge operation determination parts 223-1 and 223-2 and for disconnecting the resistance and the DC link upon reception of a command for stopping the resistance discharge operation from the discharge operation determination parts 223-1 and 223-2, respectively.

Further, described above, a communication rate of a communication interface between an existing device such as the rectifier 211 and others and the resistance discharge units 213-1 and 213-2 to be added on is low. Therefore, the voltage correction amount calculation parts 224-1 and 224-2 each preferably calculate a correction amount, for example, prior to the start of motor drive.

Figure 8:
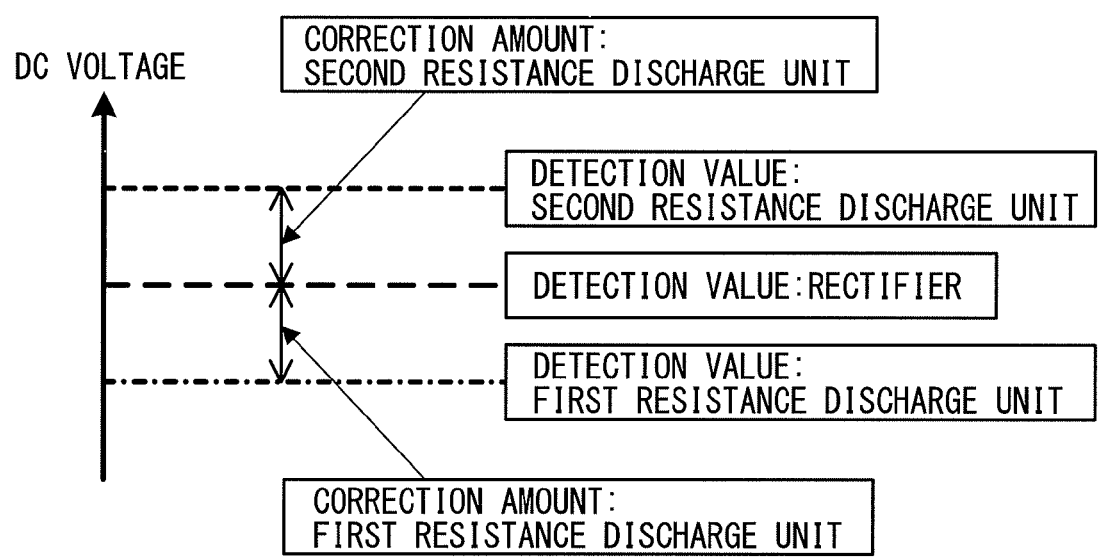
FIG. 8 is a chart illustrating a voltage correction amount calculation part and a voltage correction part inside a resistance discharge unit in the motor control apparatus according to the third embodiment illustrated in FIG. 7.

Next, operations of the resistance discharge units 213-1 and 213-2 will be described with reference to FIG. 8, FIG. 9a, and FIG. 9b. FIG. 8 is a chart illustrating the voltage correction amount calculation part and the voltage correction part inside the resistance discharge unit in the motor control apparatus according to the third embodiment illustrated in FIG. 7. Further, FIG. 9a is a chart illustrating a resistance discharge operation in the motor control apparatus according to the third embodiment illustrated in FIG. 7 and the chart illustrates a relationship between a resistance discharge operation start level and a resistance discharge operation stop level and a DC voltage in the DC link. FIG. 9b is a chart illustrating a resistance discharge operation in the motor control apparatus according to the third embodiment illustrated in FIG. 7 and the chart illustrates the execution and stop of the resistance discharge operation. The resistance discharge units 213-1 and 213-2 of FIG. 7 are expressed as a first resistance discharge unit and a second resistance discharge unit, respectively, in FIG. 8, FIG. 9a, and FIG. 9b.

There are errors in a detection value of a DC voltage in the DC link between the rectifier voltage detection part 220 and the resistance discharge unit voltage detection parts 222-1 and 222-2. Here, as one example, as illustrated in FIG. 8, a description will be given for a case where a detection value of the DC voltage according to the resistance discharge unit voltage detection part 222-2 inside the second resistance discharge unit (the resistance discharge unit 213-2 of FIG. 7) is larger than a detection value of the DC voltage according to the rectifier voltage detection part 220 and a detection value of the DC voltage according to the resistance discharge unit voltage detection part 222-1 inside the first resistance discharge unit (the resistance discharge unit 213-1 of FIG. 7) is smaller than a detection value of the DC voltage according to the rectifier voltage detection part 220.

In this case, in the second resistance discharge unit, as illustrated in FIG. 8, the voltage correction amount calculation part 224-2 calculates a correction amount to match a DC voltage value detected by the resistance discharge unit voltage detection part 222-2 to a DC voltage value detected by the rectifier voltage detection part 220 from a deviation between the DC voltage value detected by the rectifier voltage detection part 220 and the DC voltage value detected by the resistance discharge unit voltage detection part 222-2. The voltage correction part 225-2 corrects the DC voltage value detected by the resistance discharge unit voltage detection part 222-2 using the correction amount produced by the voltage correction amount calculation part 224-2 to produce a corrected DC voltage value.

In the same manner, in the first resistance discharge unit, as illustrated in FIG. 8, the voltage correction amount calculation part 224-1 calculates a correction amount to match a DC voltage value detected by the resistance discharge unit voltage detection part 222-1 to a DC voltage value detected by the rectifier voltage detection part 220 from a deviation between the DC voltage value detected by the rectifier voltage detection part 220 and the DC voltage value detected by the resistance discharge unit voltage detection part 222-1. The voltage correction part 225-1 corrects the DC voltage value detected by the resistance discharge unit voltage detection part 222-1 using the correction amount produced by the voltage correction amount calculation part 224-1 to produce a corrected DC voltage value.

In this manner, the voltage correction parts 225-1 and 225-2 each inside the first resistance discharge unit and the second resistance discharge unit make a correction to match the DC voltage values detected by the resistance discharge unit voltage detection parts 222-1 and 222-2 inside the first resistance discharge unit and the second resistance discharge unit to a DC power source voltage detection value according to the rectifier voltage detection part 220, respectively.

As illustrated in FIG. 9a and FIG. 9b, such a correction removes an imbalance between the discharge operations of the respective resistance discharge units. In other words, a resistance discharge operation in the case where an amount of regenerative energy consumable in any one of the first resistance discharge unit and the second resistance discharge unit is regenerated from the motor 2 is described as follows.

Initially, when regenerative energy generated in the motor 2 is converted into DC power by the inverter 212, then a DC voltage in the DC link between the rectifier 211 and the inverter 212 starts to rise as illustrated in FIG. 9a. The voltage correction amount calculation parts 224-1 and 224-2 and the voltage correction parts 225-1 and 225-2 inside the first resistance discharge unit and the second resistance discharge unit operate, respectively, to remove a detection error of the DC voltage. In other words, as illustrated in FIG. 9a, corrected DC voltage values produced match each other between the voltage correction parts 225-1 and 225-2.

As illustrated in FIG. 9a, when the corrected DC voltage values having the same value produced by the voltage correction parts 225-1 and 225-2 each rise up to the resistance discharge operation start level (the first threshold value) of the first resistance discharge unit and the second resistance discharge unit, then the first resistance discharge unit and the second resistance discharge unit simultaneously start a resistance discharge operation, respectively (FIG. 9b).

The DC voltage in the DC link is turned into a drop, as illustrated in FIG. 9a, by the start of the resistance discharge operations by the first resistance discharge unit and the second resistance discharge unit.

The DC voltage of the DC link continues to drop and then reaches the resistance discharge operation stop level (the second threshold value) of the first resistance discharge unit and the second resistance discharge unit. When the DC voltage drops down to the resistance discharge operation stop level (the second threshold value) of the first resistance discharge unit and the second resistance discharge unit, the first resistance discharge unit and the second resistance discharge unit simultaneously stop the resistance discharge operation.

When the aforementioned regenerative energy continues to be produced in the motor 2, the aforementioned processing causes both the first resistance discharge unit and the second resistance discharge unit to simultaneously start and stop the resistance discharge operation and therefore, an imbalance of an operation state where no resistance discharge operation is executed by either of the resistance discharge units is removed. In this manner, according to the third embodiment, when the voltage correction amount calculation parts 224-1 and 224-2 and the voltage correction parts 225-1 and 225-2 are provided inside the resistance discharge units 213-1 and 213-2, respectively, an imbalance between the discharge operations of the respective resistance discharge units is removed and the amounts of heat generation of the respective resistance discharge units are equalized. As a result, a case where an allowable temperature is exceeded in only a single resistance discharge unit does not occur, which makes it possible to prevent a discharge capacity of an entire system including a plurality of resistance discharge units from decreasing.

While the motor control apparatus 201 stably operates, the DC voltage in the DC link varies with an operation state of the motor 2. On the other hand, prior to the start of drive of the motor control apparatus 201, the DC voltage of the DC link depends only on three-phase alternate current of the AC input side of the rectifier 211 without a variation as described above, resulting in a constant value and therefore, the voltage correction amount calculation parts 224-1 and 224-2 each preferably calculate a correction amount, for example, prior to the start of motor drive.

Further, when DC voltage values detected by the rectifier voltage detection part 220 and the resistance discharge unit voltage detection parts 222-1 and 222-2 are filtered, a DC portion (an average value) excluding a harmonic component is obtainable. Therefore, the voltage correction amount calculation parts 224-1 and 224-2 each possibly calculate a correction amount from a deviation between a value obtained by removing a harmonic component from the DC voltage value detected by the rectifier voltage detection part 220 and a value obtained by removing the harmonic component from the DC voltage value each detected by the resistance discharge unit voltage detection parts 222-1 and 222-2, which makes it possible to remove the effect of variations of the DC voltage in the DC link immediately after the start of drive of the motor 2 as described above and the effect of variations of the DC voltage in the DC link depending on an operation state of the motor 2 during a steady operation of the motor control apparatus.

Figure 10:
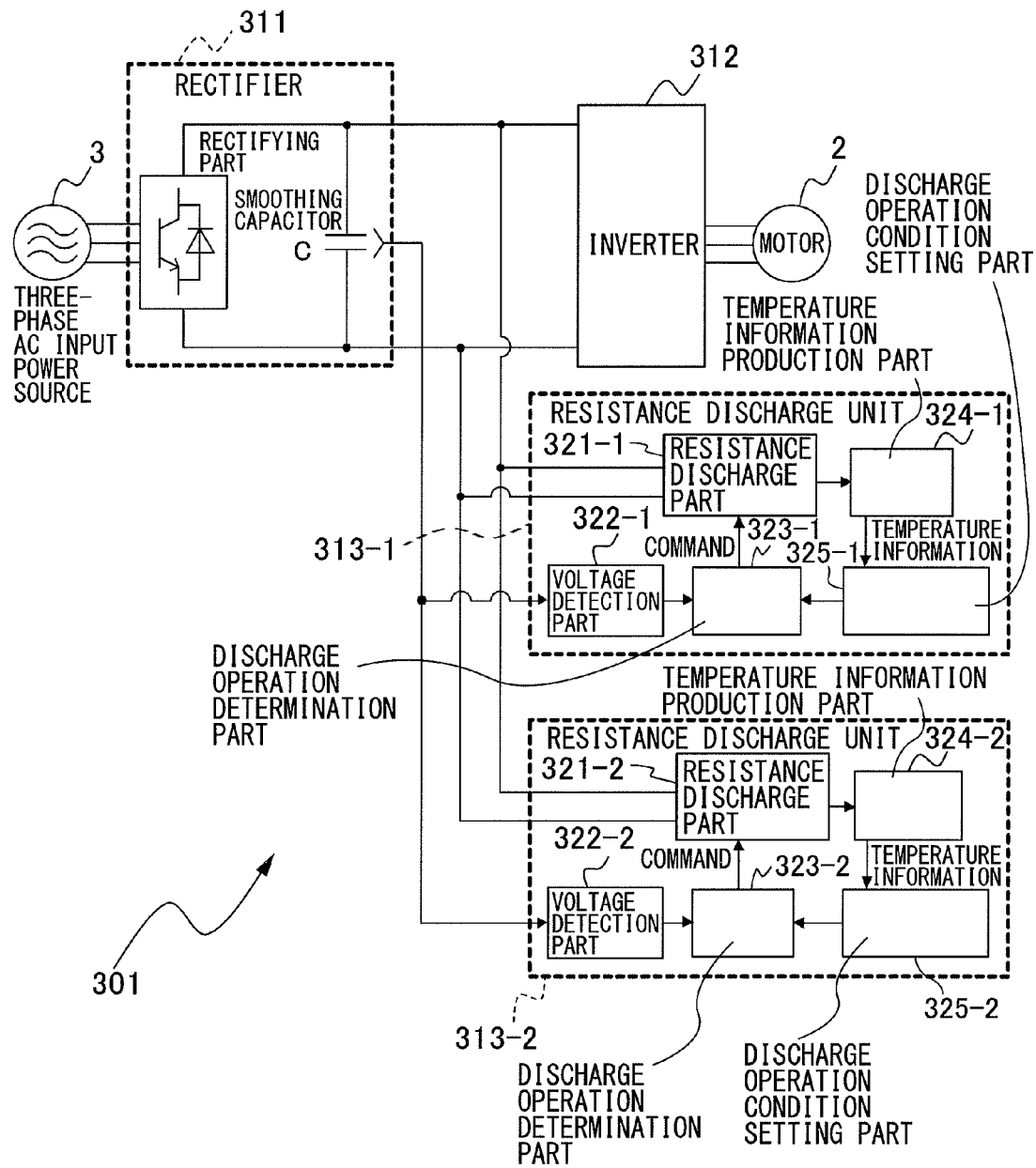
FIG. 10 is a diagram illustrating a configuration of a motor control apparatus according to a fourth embodiment.

Next, the motor control apparatus according to the fourth embodiment will be described with reference to FIG. 10 to FIG. 12, FIG. 13a, FIG. 13b, FIG. 14a, and FIG. 14b. FIG. 10 is a diagram illustrating a configuration of the motor control apparatus according to the fourth embodiment. A motor control apparatus 301 according to the fourth embodiment includes a rectifier 311, an inverter 312, and at least two resistance discharge units 313-1 and 313-2. In FIG. 10, as one example, the number of resistance discharge units has been set to be 2 but the number of the resistance discharge units is not limited. Another number is employable as long as it is more than 1.

The rectifier 311 rectifies AC power supplied from an AC input side including a three-phase AC input power source 3 to output DC power. In the fourth embodiment, the embodiment of the rectifier 311 used is not specifically limited and, for example, a 120-degree conductive rectifying circuit or a rectifying circuit of a PWM control type is employable.

The rectifier 311 and the inverter 312 are connected together via the DC link. The inverter 312 is configured as a conversion circuit including a switching device therein, such as a PWM inverter and the like. The inverter 312 converts DC power input from a DC input side of the DC link into three-phase AC power having a desired voltage and a desired frequency for switching-operating the inner switching device and for driving the motor 2 based on a motor drive command received from a superior control apparatus (not illustrated). The motor 2 operates based on supplied three-phase AC power being voltage-variable and frequency-variable. Further, during deceleration of the motor 2, regenerative power is generated, and based on the motor drive command received from the superior control apparatus, AC power that is the regenerative power generated in the motor 2 is converted into DC power to be then returned to the DC link. In this manner, the inverter 312 performs power interconversion of DC power in the DC link and AC power that is driving power or regenerative power of the motor 2 based on the received motor drive command. The drive control of a single motor 2 by the motor control apparatus 301 is being dealt with as an example. However, the number of motors does not limit the present invention and another number is employable. In the case of a plurality of motors 2 provided, a respective inverter 312 is provided for each motor 2.

The motor control apparatus 301 includes at least two resistance discharge units 313-1 and 313-2. The resistance discharge units 313-1 and 313-2 each are connected to the DC link to perform resistance discharge of DC power of the DC link. The resistance discharge units 313-1 and 313-2 execute a resistance discharge operation for performing resistance discharge of DC power of the DC link when predetermined conditions are satisfied.

These resistance discharge units 313-1 and 313-2 each include an individual resistance discharge part, voltage detection part, discharge operation determination part, temperature information production part, and discharge operation condition setting part.

In other words, the resistance discharge unit 313-1 includes a resistance discharge part 321-1, a voltage detection part 322-1, a discharge operation determination part 323-1, a temperature information production part 324-1, and a discharge operation condition setting part 325-1. The resistance discharge part 321-1 starts or stops a resistance discharge operation for performing resistance discharge of DC power of the DC link based on a received command. The voltage detection part 322-1 detects a DC voltage value in the DC link. The temperature information production part 324-1 produces temperature information indicating a temperature in the resistance discharge part 321-1. The discharge operation condition setting part 325-1 sets a first threshold value that is a resistance discharge operation start level based on temperature information. Further, the discharge operation condition setting part 325-1 sets a second threshold value that is a resistance discharge operation stop level based on the temperature information. The discharge operation determination part 323-1 commands the resistance discharge part 321-1 to start a resistance discharge operation when having determined a DC voltage value detected by the voltage detection part 322-1 to be larger than the first threshold value and commands the resistance discharge part 321-1 to stop the resistance discharge operation when having determined the DC voltage value detected by the voltage detection part 322-1 to be smaller than the second threshold value that is smaller than the first threshold value.

In the same manner, the resistance discharge unit 313-2 includes a resistance discharge part 321-2, a voltage detection part 322-2, a discharge operation determination part 323-2, a temperature information production part 324-2, and a discharge operation condition setting part 325-2. The resistance discharge part 321-2 starts or stops a resistance discharge operation for performing resistance discharge of DC power of the DC link based on a received command. The voltage detection part 322-2 detects a DC voltage value in the DC link. The temperature information production part 324-2 produces temperature information indicating a temperature in the resistance discharge part 321-2. The discharge operation condition setting part 325-2 sets a first threshold value that is a resistance discharge operation start level based on temperature information. Further, the discharge operation condition setting part 325-2 sets a second threshold value that is a resistance discharge operation stop level based on the temperature information. The discharge operation determination part 323-2 commands the resistance discharge part 321-2 to start a resistance discharge operation when having determined a DC voltage value detected by the voltage detection part 322-2 to be larger than the first threshold value and commands the resistance discharge part 321-2 to stop the resistance discharge operation when having determined the DC voltage value detected by the voltage detection part 322-2 to be smaller than the second threshold value that is smaller than the first threshold value.

In the discharge operation condition setting parts 325-1 and 325-2 each, a predetermined base temperature is preset. The discharge operation condition setting parts 325-1 and 325-2 each change a setting of a first threshold value and a second threshold value corresponding to a base temperature to a higher level when a temperature indicated by temperature information has been higher than the base temperature, and reset the first threshold value and the second threshold value having been set at the high level to the first threshold value and the second threshold value corresponding to the base temperature when the temperature indicated by the temperature information has dropped and returned to the base temperature. This operation will be described in detail later.

Next, a specific example of production of temperature information by the temperature information production part inside the resistance discharge unit will be described with reference to FIG. 11 and FIG. 12. Both first and second specific examples will be described with respect to the resistance discharge unit 313-1 and a description of the resistance discharge unit 313-2 will be omitted as it has the same configuration.

Figure 11:
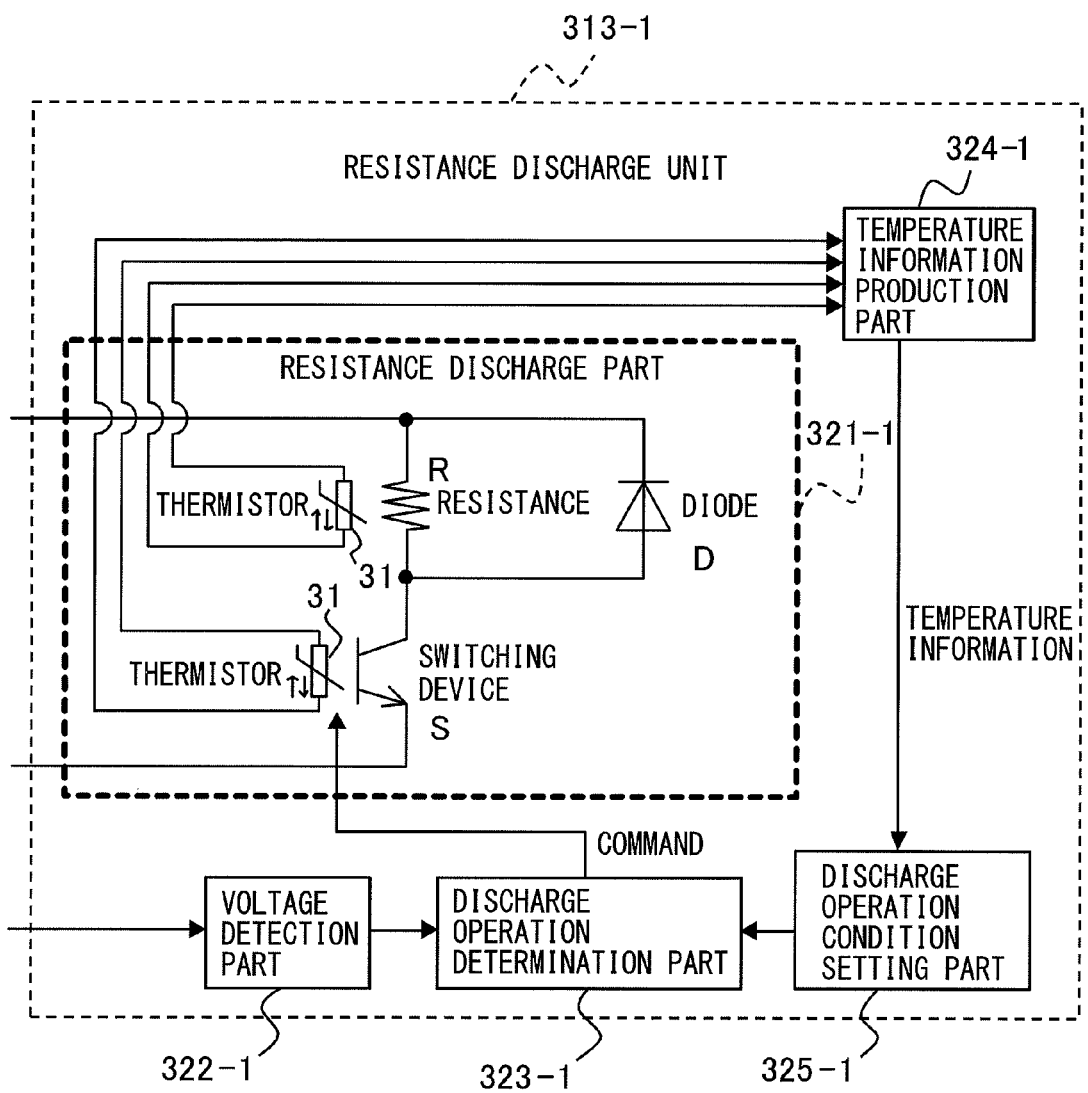
FIG. 11 is a diagram illustrating a first specific example of the production of temperature information by a temperature information production part in the motor control apparatus according to the fourth embodiment.

FIG. 11 is a diagram illustrating the first specific example of the production of temperature information by the temperature information production part in the motor control apparatus according to the fourth embodiment. As illustrated in FIG. 11, the resistance discharge part 321-1 includes a resistance R, a switching device S for connecting the resistance R to the DC link upon reception of a command for starting a resistance discharge operation from the discharge operation determination part 323-1 and for disconnecting the resistance R and the DC link upon reception of a command for stopping the resistance discharge operation from the discharge operation determination part 323-1, and a reflux diode D. Of the elements of the resistance discharge part 321-1, the resistance R and the switching device S generate a large amount of heat.

Therefore, in the first specific example, as illustrated in FIG. 11, a thermistor 31 is disposed in a vicinity of at least either of the resistance R and the switching device S inside the resistance discharge unit 321-1 and a temperature of at least either of the resistance R and the switching device S provided with the thermistor 31 is measured, whereby the temperature information production part produces temperature information based on an output of this thermistor 31. FIG. 11 illustrates, as one example, the case where the thermistor 31 is provided for both the resistance R and the switching device S.

The temperature information production part 324-1 produces temperature information based on an output of the thermistor 31. When the thermistor 31 is disposed in a vicinity of either of the resistance R and the switching device S, the temperature information production part 324-1 produces temperature information indicating a temperature of the device provided with the thermistor 31 based on the output of the thermistor 31. Further, as illustrated in FIG. 11, when the thermistor 31 is provided for both the resistance R and the switching device S, the temperature information production part 324-1 acquires outputs from two thermistors 31. In this case, for example, of the outputs of the two thermistors 31, based on an output closer to an allowable temperature of a device subjected to measurement of a temperature or an output indicating a higher temperature, temperature information indicating a temperature of the device subjected to measurement of a temperature is produced.

Figure 12:
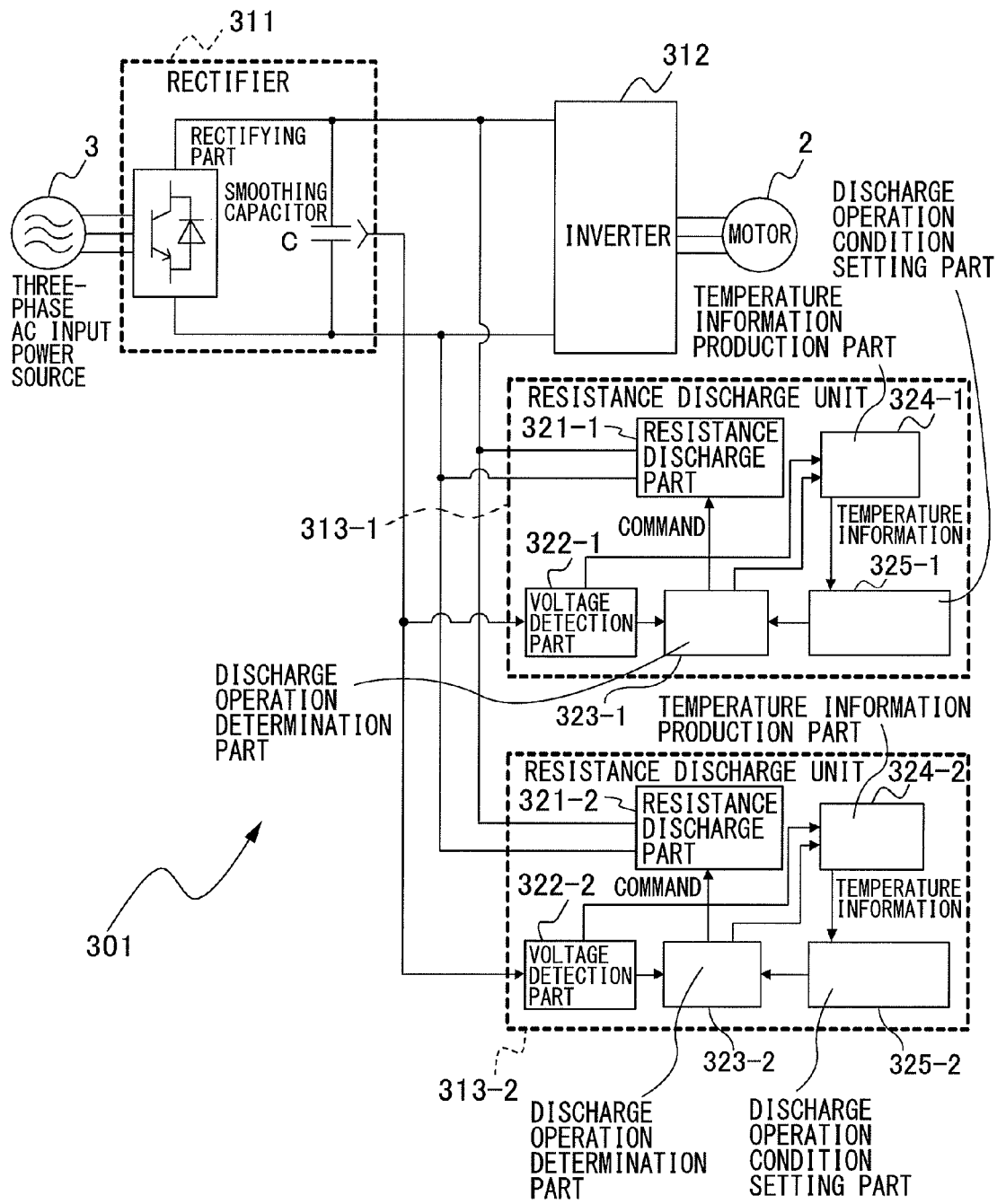
FIG. 12 is a diagram illustrating a second specific example of the production of temperature information by the temperature information production part in the motor control apparatus according to the fourth embodiment.

FIG. 12 is a diagram illustrating the second specific example of the production of temperature information by the temperature information production part in the motor control apparatus according to the fourth embodiment. In the second specific example, the temperature information production part 324-1 estimates a temperature of either of the resistance R and the switching device S or temperatures of both the resistance R and the switching device S based on a DC voltage value detected by the voltage detection part 322-1 and a command output by the discharge operation determination part 323-1 to produce temperature information. In other words, in the second specific example, no thermistor 31 as seen in the first specific example is provided, and instead, using a temperature estimation based on the DC voltage value detected by the voltage detection part 322-1 and the command output by the discharge operation determination part 323-1, the temperature information production part 324-1 produces temperature information. One example of the temperature estimation is described as follows.

When the discharge operation determination part 323-1 outputs an ON-command (in other words, the case of the start or execution of a resistance discharge operation) and the discharge operation determination part 323-1 outputs an OFF-command (in other words, the case of the stop of the resistance discharge operation), a loss $P_R$ [W] of the resistance R inside the resistance discharge part 321-1 is represented by the following expression 1 for each case, in which a DC voltage value detected by the voltage detection part 322-1 is designated as V [V] and a resistance value of the resistance R is designated as R [Ω].

$$P_R = V^2/R$$

(the case of the demand on of the discharge operation determination part)

$$P_R = 0 \quad (1)$$

(the case of the demand off of the discharge operation determination part)

On the other hand, when the discharge operation determination part 323-1 outputs an ON-command (in other words, the case of the start or execution of a resistance discharge operation) and the discharge operation determination part 323-1 outputs an OFF-command (in other words, the case of the stop of the resistance discharge operation), a loss $P_S$ [W] of the switching device S inside the resistance discharge part 321-1 is represented by the following expression 2 for each case, in which a voltage between collector emitters is designated as $V_{ce}$ [V] when, for example, an IGBT is used as the switching device S.

$$P_S = (V/R) \times V_{ce}$$

(the case of the demand on of the discharge operation determination part)

$$P_S = 0 \quad (2)$$

(the case of the demand off of the discharge operation determination part)

Herein, since the loss $P_s$ of the switching device S is a steady loss, a value obtained by further adding a switching loss to the loss $P_S$ is possibly defined as a loss $P_S$ of the switching device S.

When a loss of a device subjected to estimation of a temperature is designated as P [W], a thermal resistance is designated as K [° C./W], and a thermal time constant is designated as τ [sec], a temperature change portion ΔT of the device subjected to estimation of a temperature is represented by the following expression 3 using a transfer function in a frequency area and therefore, it is possible to estimate a temperature at time t. Herein, P(s) is $P_R$ represented by expression 1 when the device subjected to estimation of a temperature is the resistance R, and $P_S$ represented by expression 2 when the device is the switching device S.

$$\Delta T(s) = \frac{K}{\tau s + 1} \cdot P(s) \quad (3)$$

In this manner, the temperature information production part 324-1 estimates a temperature of either of the resistance R and the switching device S or temperatures of both the resistance R and the switching device S according to expression 1 to expression 3, and produces temperature information indicating a temperature of a device subjected to estimation of a temperature based on a temperature estimate closer to an allowable temperature of the device subjected to estimation of a temperature or a temperature estimate indicating a higher temperature in the case of a plurality of temperature estimates.

Figures 13A, 13B:
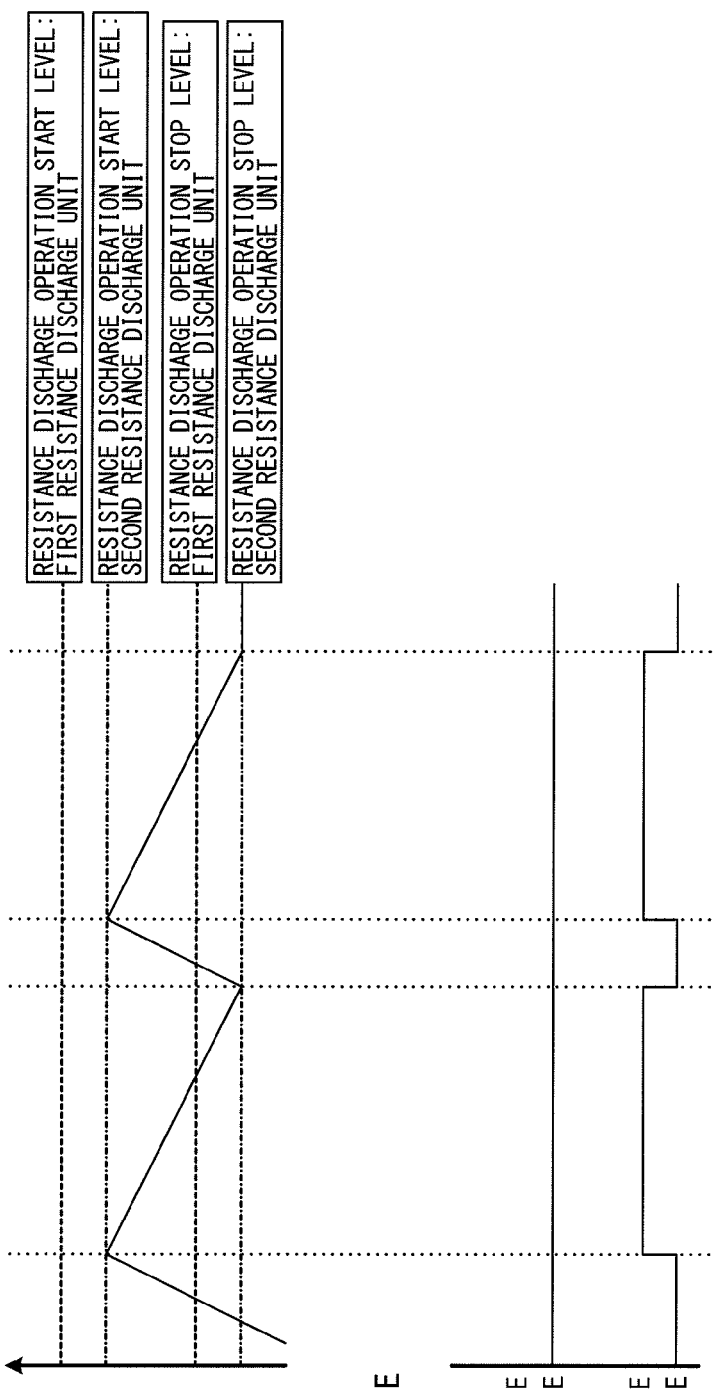
FIG. 13a is a chart illustrating a resistance discharge operation in the motor control apparatus according to the fourth embodiment illustrated in FIG. 10 to FIG. 12, the chart illustrating a relationship between a resistance discharge operation start level and a resistance discharge operation stop level and a DC voltage in a DC link.
FIG. 13b is a chart illustrating a resistance discharge operation in the motor control apparatus according to the fourth embodiment illustrated in FIG. 10 to FIG. 12, the chart illustrating the execution and stop of the resistance discharge operation.

Next, operations of the resistance discharge units 313-1 and 313-2 will be described with reference to FIG. 13a, FIG. 13b, FIG. 14a, and FIG. 14b. FIG. 13a is a chart illustrating a resistance discharge operation in the motor control apparatus according to the fourth embodiment illustrated in FIG. 10 to FIG. 12, and the chart illustrates a relationship between a resistance discharge operation start level and a resistance discharge operation stop level and a DC voltage in a DC link. FIG. 13b is a chart illustrating the resistance discharge operation in the motor control apparatus according to the fourth embodiment illustrated in FIG. 10 to FIG. 12, and the chart illustrates the execution and stop of the resistance discharge operation, and FIG. 14a is a chart illustrating a resistance discharge operation in the motor control apparatus according to the fourth embodiment illustrated in FIG. 10 to FIG. 12, and the chart illustrates a relationship between a resistance discharge operation start level and a resistance discharge operation stop level and a DC voltage in the DC link. FIG. 14b is a chart illustrating the resistance discharge operation in the motor control apparatus according to the fourth embodiment illustrated in FIG. 10 to FIG. 12, and the chart illustrates the execution and stop of the resistance discharge operation. The resistance discharge units 313-1 and 313-2 of FIG. 10 to FIG. 12 are expressed as a first resistance discharge unit and a second resistance discharge unit, respectively, in FIG. 13a, FIG. 13b, FIG. 14a, and FIG. 14b.

The discharge operation condition setting parts 325-1 and 325-2 each sequentially change, for resetting, only a first threshold value or both a first threshold value and a second threshold value to be a higher level, as a temperature indicated by temperature information increases when the temperature indicated by the temperature information is higher than a base temperature. Herein, in the case where only the first threshold value is sequentially changed, the discharge operation condition setting parts 325-1 and 325-2 each further reset the first threshold value having been reset at the high level to the first threshold value corresponding to the base temperature when the temperature indicated by the temperature information has dropped and returned to the base temperature. Further, in the case where both the first threshold value and the second threshold value are sequentially changed, the discharge operation condition setting parts 325-1 and 325-2 each further reset both the first threshold value and the second threshold value having been reset at the high level to both the first threshold value and the second threshold value corresponding to the base temperature when the temperature indicated by the temperature information has dropped and returned to the base temperature.

A resistance discharge operation in the case where regenerative energy having an amount consumable in any one of the first resistance discharge unit and the second resistance discharge unit has been regenerated from the motor 2 is described as follows.

A description will be given for on a case in which there occurs an error between the resistance discharge units with respect to a resistance discharge operation start level and a resistance discharge operation stop level, and as an initial state, as illustrated in FIG. 2a having been already described, a resistance discharge operation start level (a first threshold value) and a resistance discharge operation stop level (a second threshold value) of the second resistance discharge unit are higher than a resistance discharge operation start level (a first threshold value) and a resistance discharge operation stop level (a second threshold value) of the first resistance discharge unit, respectively. A temperature at the time when the resistance discharge operation start level (the first threshold value) and the resistance discharge operation stop level (the second threshold value) are at the levels illustrated in FIG. 2a is designated as a "base temperature". FIG. 2a illustrates an unbalanced operation state in which the first resistance discharge unit executes a resistance discharge operation but the second resistance discharge unit does not execute a resistance discharge operation. Therefore, in this case, an amount of heat generation of the first resistance discharge unit becomes larger than an amount of heat generation of the second resistance discharge unit, resulting in an increase in the temperature of the first resistance discharge unit.

The temperature information production part 324-1 inside the first resistance discharge unit produces temperature information indicating a temperature in the resistance discharge part 321-1, and the temperature information production part 324-2 inside the second resistance discharge unit produces temperature information indicating a temperature in the resistance discharge part 321-2. Since only the first resistance discharge unit executes a resistance discharge operation as described above, temperature information produced by the temperature information production part 324-1 inside the first resistance discharge unit indicates that the temperature in the resistance discharge part 321-1 is gradually increasing. On the other hand, since the second resistance discharge unit executes no resistance discharge operation, temperature information produced by the temperature information production part 324-2 inside the second resistance discharge unit does not indicate a temperature increase in the resistance discharge part 321-2.

When a temperature indicated by the temperature information has been higher than the base temperature, the discharge operation condition setting part 325-1 inside the first resistance discharge unit performs a setting change of the first threshold value that is the resistance discharge operation start level and the second threshold value that is the resistance discharge operation stop level corresponding to the base temperatures illustrated in FIG. 2a to higher levels. On the other hand, since there is no temperature increase in the second resistance discharge unit as described above, the discharge operation condition setting part 325-2 inside the second resistance discharge unit is not changed in the resistance discharge operation start level and the resistance discharge operation stop level.

When the temperature continues to increase, the discharge operation condition setting part 325-1, along with this, sequentially performs a setting change of the resistance discharge operation start level and the resistance discharge operation stop level to higher levels. As illustrated in FIG. 13a, in the case where even when the resistance discharge operation start level in the first resistance discharge unit has been higher than the resistance discharge operation start level in the second resistance discharge unit with no setting change, the motor 2 still continues to produce regenerative energy, a DC voltage in the DC link also increases, but when this DC voltage reaches the resistance discharge operation start level in the second resistance discharge unit, the second resistance discharge unit starts a resistance discharge operation (FIG. 13b).

The DC voltage in the DC link is turned into a drop by the start of the resistance discharge operation by the second resistance discharge unit as illustrated in FIG. 13a.

The DC voltage in the DC link continues to drop and then reaches the resistance discharge operation stop level (the second threshold value) of the second resistance discharge unit. When the DC voltage drops down to the resistance discharge operation stop level (the second threshold value) of the second resistance discharge unit, the second resistance discharge unit stops the resistance discharge operation. When the temperature indicated by the temperature information has dropped and returned to the base temperature, both the resistance discharge operation start level (the first threshold value) and the resistance discharge operation stop level (the second threshold value) having been reset at the high levels are reset to the resistance discharge operation start level (the first threshold value) and the resistance discharge operation stop level (the second threshold value) corresponding to the base temperature, respectively.

In this manner, according to the fourth embodiment, in contrast to the case described with reference to FIG. 2a and FIG. 2b, the second resistance discharge unit executes a resistance discharge operation but the first resistance discharge unit executes no resistance discharge operation. Since only the second resistance discharge unit executes the resistance discharge operation, an amount of heat generation of the second resistance discharge unit increases, resulting in a temperature increase in the second resistance discharge unit. When the temperature increase of the second resistance discharge unit continues, the discharge operation condition setting part 325-2 inside the second resistance discharge unit performs a setting change of the resistance discharge operation start level of the second resistance discharge unit to a higher level, resulting in returning to the state of FIG. 2a where the resistance discharge operation start level in the second resistance discharge unit is higher than the resistance discharge operation start level in the first resistance discharge unit. When the temperature indicated by the temperature information has dropped and returned to the base temperature, both the resistance discharge operation start level and the resistance discharge operation stop level having been reset at the high levels are reset to the resistance discharge operation start level and the resistance discharge operation stop level corresponding to the base temperature, respectively. The aforementioned setting change of the resistance discharge operation start level and the resistance discharge operation stop level is repeated alternately in the first resistance discharge unit and the second resistance discharge unit and thereby the first resistance discharge unit and the second resistance discharge unit generate the same amount of heat in view of a temporal average over a medium- to long-term period.

Further, as illustrated in FIG. 14a, when a setting change of the resistance discharge operation start level of the first resistance discharge unit or the resistance discharge operation start level of the second resistance discharge unit has been performed to a higher level, these two resistance discharge operation start levels sometimes match each other. In this case, the first resistance discharge unit and the second resistance discharge unit operate as follows.

In other words, in the case where the resistance discharge operation start level of the first resistance discharge unit and the resistance discharge operation start level of the second resistance discharge unit match each other as illustrated in FIG. 14a, when the motor 2 continues to generate regenerative energy, a DC voltage in the DC link also rises. When the DC voltage rises up to the resistance discharge operation start level of the first resistance discharge unit and the second resistance discharge unit, then the first resistance discharge unit and the second resistance discharge unit simultaneously start a resistance discharge operation (FIG. 14b).

The DC voltage in the DC link is turned into a drop by the start of the resistance discharge operation by the first resistance discharge unit and the second resistance discharge unit as illustrated in FIG. 14a.

The DC voltage in the DC link continues to drop and then reaches the resistance discharge operation stop level of the first resistance discharge unit and the second resistance discharge unit. When the DC voltage drops down to the resistance discharge operation stop level of the first resistance discharge unit and the second resistance discharge unit, the first resistance discharge unit and the second resistance discharge unit simultaneously stop the resistance discharge operation.

In this manner, according to the fourth embodiment, when the temperature information production parts 324-1 and 324-2 and the discharge operation condition setting parts 325-1 and 325-2 are provided inside the resistance discharge units 313-1 and 313-2, respectively, an imbalance between discharge operations of the respective resistance discharge units is removed and therefore, the amounts of heat generation of the respective resistance discharge units are equalized. As a result, a case where an allowable temperature is exceeded in only a single resistance discharge unit does not occur, which makes it possible to prevent a discharge capacity of an entire system including a plurality of resistance discharge units from decreasing.

In the above examples, a setting change of both the resistance discharge operation start level and the resistance discharge operation stop level has been performed. However, a setting change of only the resistance discharge operation start level also makes it possible to produce the same effect.

The present invention is applicable, as a motor control apparatus for driving motors in machine tools, forging presses, injection molding machines, industrial machines, and robots, to motor control apparatuses including a rectifier for converting input alternate current into direct current and an inverter for converting direct current output from a DC converting part into alternate current supplied as driving power of each motor, in which at least two resistance discharge units are provided in a DC link between the rectifier and the inverter and regenerative energy generated during motor deceleration is consumed as thermal energy of resistances inside the resistance discharge units.

The first to fourth aspects make it possible to realize a motor control apparatus having enhanced maintenance efficiency including at least two resistance discharge units for consuming regenerative energy from a motor by resistance discharge, in which at least two resistance discharge units using a device having a small rated current value are combined and used in accordance with a regenerative energy amount of a motor driven by the motor control apparatus, which thereby makes it possible to reduce a discharge capacity necessary for a system without an increase in model type.

Further, according to the second aspect, when a superior discharge operation command unit for commanding all the resistance discharge units to start or stop a resistance discharge operation is provided, an imbalance between the discharge operations of the respective resistance discharge units is removed and amounts of heat generation of the respective resistance discharge units are equalized, regardless of an operation state of the resistance discharge operation in each resistance discharge unit. As a result, a case where an allowable temperature is exceeded in only a single resistance discharge unit does not occur, which makes it possible to prevent a discharge capacity of an entire system including at least two resistance discharge units from decreasing.

Further, according to the third aspect, when a voltage correction amount calculation part and a voltage correction part are provided in each resistance discharge unit, an imbalance between the discharge operations of the respective resistance discharge units is removed and amounts of heat generation of the respective resistance discharge units are equalized. As a result, a case where an allowable temperature is exceeded in only a single resistance discharge unit does not occur, which makes it possible to prevent a discharge capacity of an entire system including at least two resistance discharge units from decreasing.

Further, according to the fourth aspect, when a temperature information production part and a discharge operation condition setting part are provided in each resistance discharge unit, an imbalance between the discharge operations of the respective resistance discharge units is removed and amounts of heat generation of the respective resistance discharge units are equalized. As a result, a case where an allowable temperature is exceeded in only a single resistance discharge unit does not occur, which makes it possible to prevent a discharge capacity of an entire system including at least two resistance discharge units from decreasing.

What is claimed is:

1. A motor control apparatus comprising:
a rectifier for rectifying AC power supplied from an AC input side to output DC power, the rectifier including a rectifier voltage detection part for detecting a DC voltage value in a DC link that is a DC output side of the rectifier;
an inverter for performing power interconversion of DC power of the DC link and AC power that is driving power or regenerative power of a motor, the inverter being connected to the DC link; and
at least two resistance discharge units each for performing resistance discharge of DC power of the DC link, the resistance discharge units each being connected to the DC link, in which each resistance discharge unit executes a resistance discharge operation for performing resistance discharge of DC power of the DC link when predetermined conditions are satisfied,
the resistance discharge units respectively including:
resistance discharge parts for starting or stopping the resistance discharge operation for performing resistance discharge of DC power of the DC link based on a received command;
resistance discharge unit voltage detection parts for detecting a DC voltage value in the DC link;
voltage correction amount calculation parts for calculating a correction amount to match a DC voltage value detected by the resistance discharge unit voltage detection parts each to a DC voltage value detected by the rectifier voltage detection part, from a deviation between the DC voltage value detected by the rectifier voltage detection part and the DC voltage value detected by the resistance discharge unit voltage detection parts each;
voltage correction parts for correcting the DC voltage value detected by the resistance discharge unit voltage detection parts each using the correction amount to produce a corrected DC voltage value; and
discharge operation determination parts for commanding the resistance discharge parts to start the resistance discharge operation when having determined the corrected DC voltage value to be larger than a first threshold value and for commanding the resistance discharge parts to stop the resistance discharge operation when having determined the corrected DC voltage value to be smaller than a second threshold value that is smaller than the first threshold value.

2. The motor control apparatus according to claim 1, wherein
the voltage correction amount calculation parts each calculate the correction amount before the motor starts being driven.

3. The motor control apparatus according to claim 1, wherein
the voltage correction amount calculation parts each calculate the correction amount from a deviation between a value obtained by removing a harmonic component from a DC voltage value detected by the rectifier voltage detection part and a value obtained by removing a harmonic component from a DC voltage value detected by the resistance discharge unit voltage detection parts each.

4. A motor control apparatus comprising:
a rectifier for rectifying AC power supplied from an AC input side to output DC power;
an inverter for performing power interconversion of DC power of the DC link and AC power that is driving power or regenerative power of a motor, the inverter being connected to the DC link that is a DC output side of the rectifier; and
at least two resistance discharge units each for performing resistance discharge of DC power of the DC link, the resistance discharge units each being connected to the DC link, in which each resistance discharge unit executes a resistance discharge operation for performing resistance discharge of DC power of the DC link when predetermined conditions are satisfied,
the resistance discharge units respectively including:
resistance discharge parts for starting or stopping the resistance discharge operation for performing resistance discharge of DC power of the DC link based on a received command;
voltage detection parts for detecting a DC voltage value in the DC link;
temperature information production parts for producing temperature information indicating a temperature in the resistance discharge parts each;
discharge operation condition setting parts for setting a first threshold value that is a resistance discharge operation start level based on the temperature information; and
discharge operation determination parts for commanding the resistance discharge parts to start the resistance discharge operation when having determined a DC voltage value detected by the voltage detection parts each to be larger than the first threshold value and for commanding the resistance discharge parts to stop the resistance discharge operation when having determined the DC voltage value detected by the voltage detection parts each to be smaller than a second threshold value that is smaller than the first threshold value.

5. The motor control apparatus according to claim 4, wherein
the discharge operation condition setting parts each set the second threshold value that is a resistance discharge operation stop level based on the temperature information.

6. The motor control apparatus according to claim 4, wherein
the discharge operation condition setting parts each perform resetting by sequentially changing the first threshold value alone or both the first threshold value and the second threshold value to a higher level as a temperature indicated by the temperature information increases in a case where the temperature indicated by the temperature information is higher than a base temperature.

7. The motor control apparatus according to claim 6, wherein
the discharge operation condition setting parts each further reset the first threshold value having been reset at the higher level to the first threshold value corresponding to the base temperature or further reset both the first threshold value and the second threshold value having been reset at the higher level to the first threshold value and the second threshold value corresponding to the base temperature when the temperature indicated by the temperature information has dropped and returned to the base temperature.

8. The motor control apparatus according to claim 4, wherein
the resistance discharge parts each comprise:
a resistance; and
a switching device for connecting the resistance to the DC link when receiving a command for starting the resistance discharge operation from the discharge operation determination parts each and for disconnecting the resistance and the DC link when receiving a command for stopping the resistance discharge operation from the discharge operation determination parts each.

9. The motor control apparatus according to claim 8, wherein
the resistance discharge parts each include a thermistor in a vicinity of at least either of the resistance and the switching device; and
the temperature information production parts each produce the temperature information based on an output of the thermistor.

10. The motor control apparatus according to claim 8, wherein
the temperature information production parts each produce the temperature information based on a DC voltage value detected by the voltage detection parts each and a command output by the discharge operation determination parts each.

* * * * *